United States Patent [19]

Middleton et al.

[11] 4,293,110
[45] Oct. 6, 1981

[54] LEADING EDGE VORTEX FLAP FOR WINGS

[75] Inventors: Wilbur D. Middleton; John A. Paulson, both of Bellevue, Wash.

[73] Assignee: The Boeing Company, Seattle, Wash.

[21] Appl. No.: 18,497

[22] Filed: Mar. 8, 1979

[51] Int. Cl.$^3$ ............................................. B64C 23/06
[52] U.S. Cl. .................................... 244/199; 244/207; 244/214
[58] Field of Search ............... 244/198, 199, 201, 204, 244/207, 213, 214, 219; 114/274

[56] References Cited

U.S. PATENT DOCUMENTS

| | | | |
|---|---|---|---|
| 3,090,584 | 5/1963 | Kuchemann et al. | 244/207 |
| 3,471,107 | 10/1969 | Ornberg | 244/199 |
| 3,480,234 | 11/1969 | Cornish | 244/199 |
| 3,831,885 | 8/1974 | Kasper | 244/214 |

FOREIGN PATENT DOCUMENTS 1119673 12/1961 Fed. Rep. of Germany ...... 244/213

Primary Examiner—Charles E. Frankfort
Attorney, Agent, or Firm—H. Gus Hartmann; B. A. Donahue

[57] ABSTRACT

A series of flaps along the leading edge of a highly swept-back wing for a supersonic airplane; wherein, the spanwise series of flaps comprise a double-flap chordwise having fore and aft flap segments. When the leading edge double-flap is positioned at a forward and downward angle-of-deflection relative to the wing, the foreflap segment is further positioned at an angle-of-deflection relative to the aft-flap segment. This difference in the deflection angles, between the fore-flap segment and the aft-flap segment, creates a vortex flow region ahead of the wing leading edge; and this vortex functions to control separation of an upper surface boundary layer airflow, over the remainder of the upper surface of the wing. Also, the vortex flow will move in a spanwise direction outboard toward the tip of a swept-back wing, while remaining forward or ahead of the upper surface of the aft-flap segment. Additional embodiments relate to various means for creating a leading edge vortex flow to maintain attached flow over the remainder of the upper surface of the wing.

65 Claims, 11 Drawing Figures

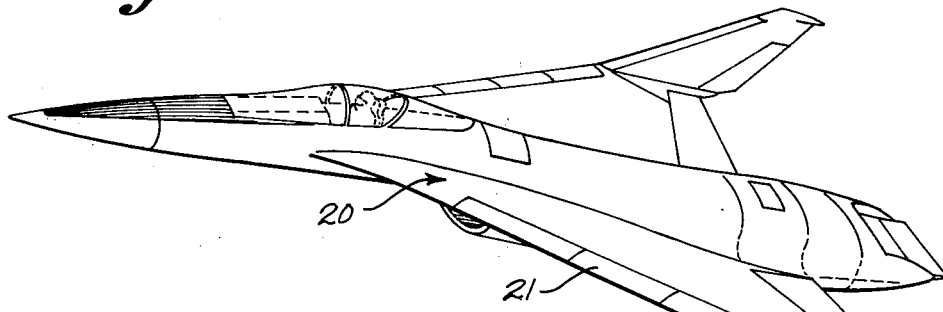
Fig. 1
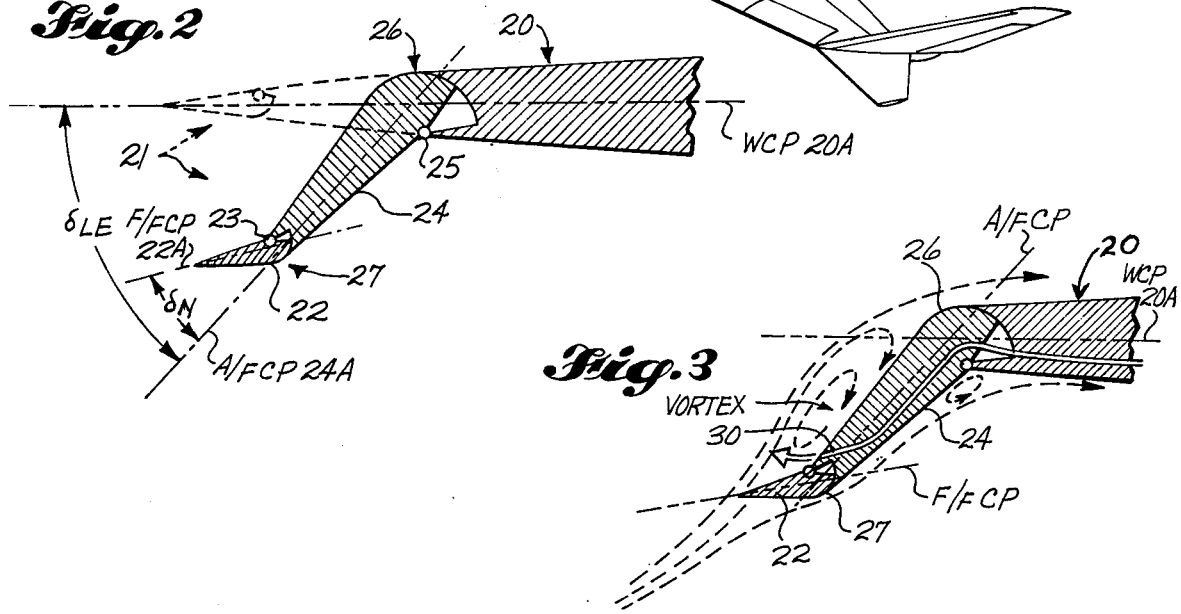
Fig. 2
Fig. 3
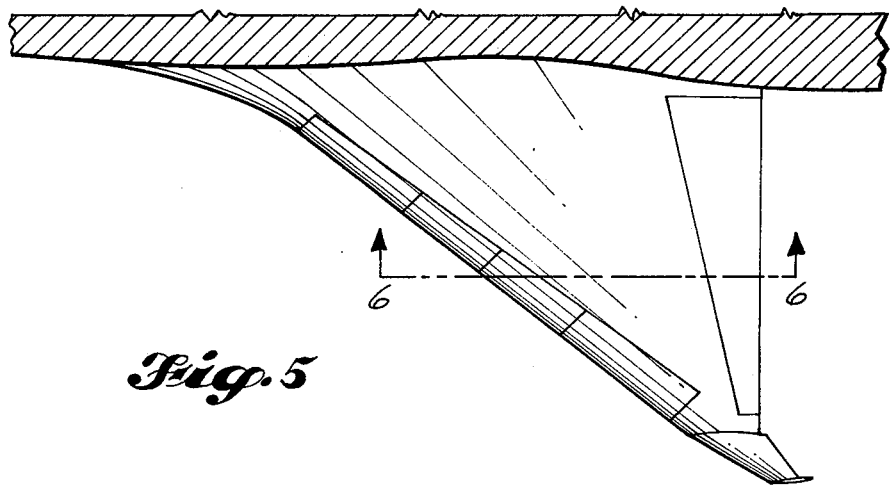
Fig. 5

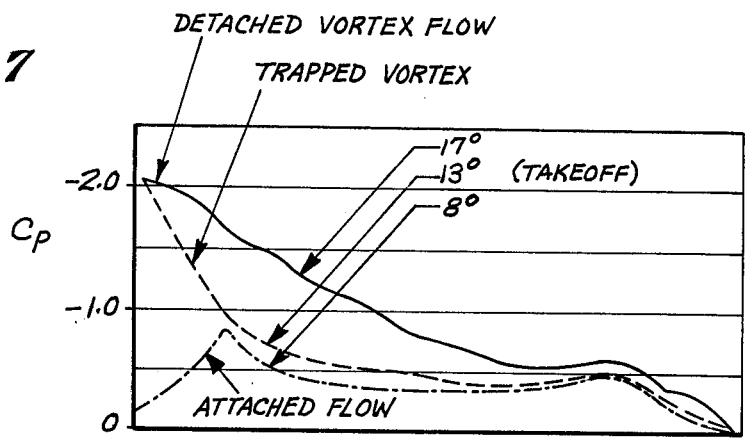
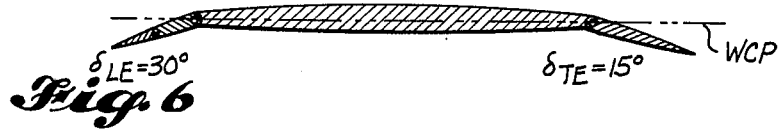
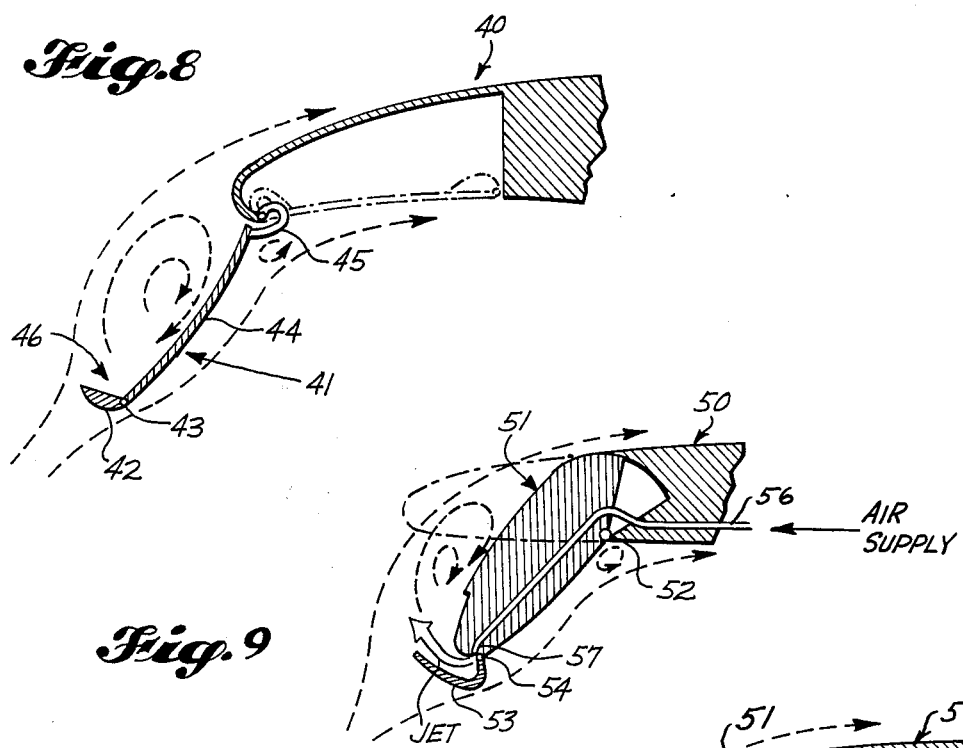

LEADING EDGE VORTEX FLAP FOR WINGS

SUMMARY OF THE INVENTION

Supersonic airplanes with highly swept-back, low aspect ratio wings, suffer from high induced drag which is not only due to the consequences of a relatively short wing span, but also, because of the loss of leading edge suction due to airflow separation at the leading edge and over the upper surface of the wing at moderate to high angles-of-attack attitude, such as during takeoff and landing phases of airplane operation. The separation of boundary layer air flow can be alleviated and drag reduced, by utilizing high-lift devices such as wing leading edge flaps. Present known wing leading edge flap devices are generally comprised of hinged panels which are deflected downward, curved panels and boundary layer control means that employ blowing or suction techniques which are available at the cost of weight and complexity.

The present invention operates in a different fashion from present techniques, i.e., those of preventing or delaying boundary layer separation at the leading edge of the wing and thus maintaining attached flow over the remaining upper surface of the wing. The present invention actually induces separation of the streamline flow, from the upper surface of a deflected leading edge flap, through the utilization of a vortex generating means, such as: a counter-deflected, double-flap; a leading edge spoiler for a deflected flap; or a jet nozzle means. The proposed solution deflects the fore-flap, of a double leading edge type flap, in a direction opposite to convention, in order to induce a vortex flow for controlling the separation of the streamline flow from the upper surface of the remainder of the wing; and at the same time, suppress lower surface streamline flow separation behind the aft-flap at low angels-of-attack.

An object of the invention, is to realize or increase the beneficial effect of a trapped vortex flow on the forward facing surface of a leading edge flap, by controlling the range of wing angle-of-attack positions that this phenomenon exists.

An advantage of the invention, lies in the decreased drag of the wing, through increased effective leading edge suction brought about by low vortex-induced surface pressures acting on the forward facing surface of the flap.

BRIEF DESCRIPTION OF THE DRAWINGS

FIG. 1 is a perspective view of a fighter airplane configuration with a low aspect ratio delta or arrow type wing incorporating a leading edge vortex flap of the present invention.

FIG. 2 is a cross-sectional view, taken in a chordwise plane, of the wing leading edge shown in FIG. 1 and shows a double-flap having a reverse deflected fore-flap segment.

FIG. 3 is a view similar to FIG. 2 and shows schematically, the airflow over the leading edge of the flap-wing combination with a vortex airflow circulation region on the forward surface of the aft-flap segment.

FIG. 5 is a top plan view of the left-half of the low aspect ratio swept wing, supersonic airplane shown in FIG. 1.

FIG. 6 is a chordwise cross-sectional view of a wing airfoil section taken in the direction 6—6 of FIG. 5; and shows a leading edge flap deflected downward at an angle of thirty degrees to the WCP (wing chord plane) and the trailing edge flap deflected downward at an angle of fifteen degrees to the WCP.

FIG. 7 is a pressure distribution graph of the airflow over the upper surface of the wing airfoil section with the leading and trailing edge flap deflection arrangement as indicated in FIG. 6.

FIG. 8 is a chordwise cross-sectional view of another embodiment of a retractable leading edge flap with a hinged forward extended vortex flap which in combination with the main leading edge flap creates a recessed region for better containment of vortex circulation on the forward face of the main flap.

FIG. 9 is a chordwise cross-sectional view of another embodiment wherein a leading edge portion of a wing is rotated downward about a spanwise hinge line; and a spoiler and air jet nozzle produce a leading edge vortex flow for the relatively rounded leading edge of the pivoted wing portion.

FIG. 10 is a chordwise cross-sectional view of another embodiment wherein an air jet nozzle is used in the leading edge of a downward deflected wing leading edge segment, for triggering the streamwise airflow into a vortex circulation region on the forward facing surface of the segment.

DESCRIPTION OF THE PREFERRED EMBODIMENTS

Figure 4:
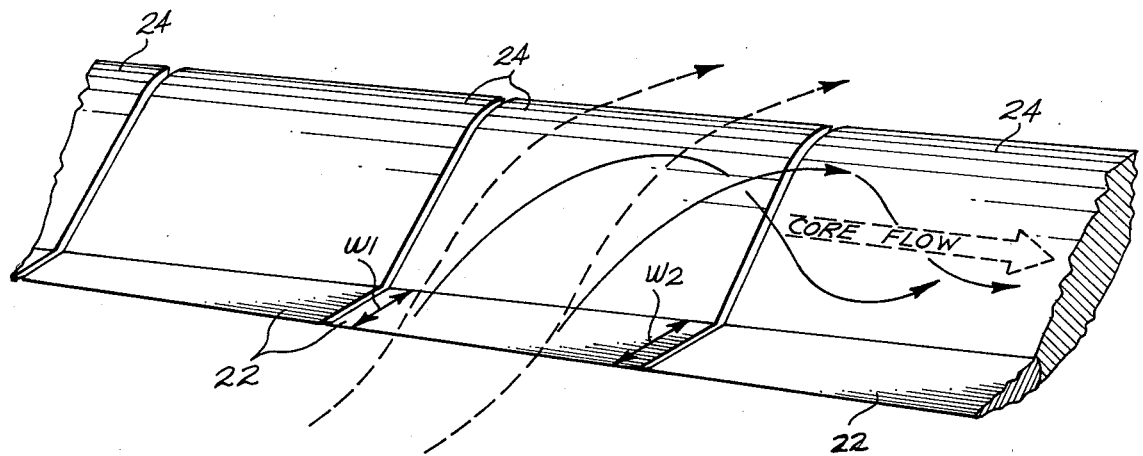
FIG. 4 is a front perspective view of the wing leading edge flap of the fighter airplane shown in FIG. 1, with the double-flap segments deflected into a downward and forward operative position; and shows how the streamwise airflow separation and vortex circulation would proceed downstream towards the wing tip of the highly swept-back wing leading edge.

FIG. 1 is a perspective view of a supersonic type of fighter airplane having a low aspect ratio, delta or arrow planform wing 20 with a leading edge flap system 21 that incorporates a leading edge vortex control system of the present invention.

FIGS. 2 and 3 are cross-sectional views, taken in a streamwise or longitudinal direction, of the leading edge of the wing shown in FIG. 1 and show a double-flap 21 comprising: a fore-flap segment 22 hinged at 23 to an aft-flap segment 24 which is hinged at 25 to relatively fixed structure of the wing 20. The fore-flap segment 22 is sized both chordwise and spanwise, and movable relative to and in conjunction with the aft-flap segment 24, for creating a vortex airflow circulation in front of the upper or forward facing surface of the aft-flap segment 24. The fore-flap segment 22 is rotated downward with respect to the wing 20 so that the fore-flap chord plane 22A forms a lesser deflection angle with the wing chord plane 20A, than that formed by the aft-flap segment with said wing chord plane 20A. This angular relationship of the flap segments 22, 24, relative to the wing, initiates and stabilizes a vortex flow in the recessed area. The vortex flow causes a low pressure region to form on the forward facing surface of the aft-flap segment 24, as shown in FIG. 3; and this vortex flow functions to induce separation of the streamwise airflow from the upper surface of the double-flap 21 and causes the streamwise airflow to flow around the vortex region and re-attach itself to the upper surface of the wing 20.

By locating a hinge line 25 between the aft-flap 24 and the leading edge of the fixed wing section 20, at the undersurface thereof, an upper surface curvature or knee 26 is formed which will contribute to maintaining the streamline airflow or boundary layer airflow attached to the upper surface of the fixed wing section. The streamline airflow, around and above the trapped separation flow or vortex core, will then re-attach itself to the upper surface of wing leading edge immediately behind the double-flap 21, at the angles-of-attack associated with the takeoff and landing operation. The vortex-induced pressures on the forward facing flap surface will then act to provide leading edge suction which would otherwise be lost. Also, by incorporating a curvature or knee 27 on the lower aft surface of the fore-flap segment, the streamline flow will more readily remain attached to the undersurface of the fixed wing leading edge. By suppressing separation of the boundary layer flow at the leading edge of the fixed wing undersurface, directly behind the aft-flap segment 24, the regional pressure is raised and drag reduced.

A further embodiment of the invention is shown in FIG. 3, which relates to utilizing a series of spanwise jets of high pressure airflow for further stimulating or inducing the formation of a vortex circulation. A jet of air is depicted as exiting from a nozzle 30 positioned slightly above the junction between the fore-flap segment 22 and the aft-flap segment 24. The jet of high pressure airflow aids in shaping and sizing the vortex circulation flow; and provides for a more complete entrenchment of the vortex circulation on the forwarded facing surface of the aft-flap segments 24.

FIG. 4 is an enlarged front perspective view of the wing leading edge, double-flap segments in a deflected position, of the fighter airplane shown in FIG. 1; wherein the double-flap 21 comprises a fore-flap spanwise segment 22 and an aft-flap spanwise segment 24. The figure shows how a streamwise airflow separation on the forward facing surface of the aft-flap segment 24 and a vortex airflow circulation region, would proceed downstream toward the wing tip, with each spanwise flap segment contributing to the strength of the vortex core flow that is moved down or in essence is pumped down due to the spanwise flow along the highly swept-back leading edge.

For straight or unswept wings, it is necessary to inject high energy air into the leading edge vortex in order to maintain a vortex circulation and also to inject air spanwise down the leading edge to keep the vortex from breaking up and spreading back over the upper surface of the wing as a random separation and causing complete wing upper surface separation. Without air injection, attached streamwise airflow on the wing upper surface would not be possible.

However, with highly swept-back leading edge wings, the streamwise airflow impinging on the leading edge will feed and maintain the circulation of the vortex flow by constantly energizing the coreflow of the vortex; and the spanwise flow induced by the high degree of sweep-back will also feed into the vortex core and cause it to flow spanwise outboard toward the wing tip. As the vortex flow proceeds outboard, it will spiral and grow in size; and the force of the vortex will increase in intensity as the distance outboard from the wing root or fuselage of the airplane increases. Therefore, if the circulation of the vortex is to be contained and totally trapped on the forward facing surface of the aft-flap 24, it is desirable to increase the chord length of both the fore-flap 22 and the aft-flap 24, in a spanwise outboard direction; beginning with a relatively short flap chord length inboard and proceeding to increase the chord length to as much as is feasible toward the tip of the wing. This is contrary to present practice; wherein, the chord length of the leading edge flap is generally decreased outboard on a tapered wing, in proportion to the decrease in wing chord section.

A constant chord length flap is more practical from an ease of manufacturing standpoint and it can also be adapted to produce a beneficial vortex flow on a highly swept-back wing leading edge. However, a certain amount of vortex flow circulation may have to be shed over the upper surface of a wing at spanwise intervals or in a continuous fashion, in order to maintain a major portion of the streamwise airflow attached to the upper surface of the wing airfoil section and this will result in a less efficient airflow pressure pattern over the wing.

The condition of the vortex circulation flow that develops spanwise, can be controlled: by varying the angle-of-deflection, of both the fore-flap 22 and the aft-flap 24; and by changing the chord length, of each of the spanwise flap segments, to increase in a spanwise outboard direction. This control of the spanwise vortex circulation can be done in a continuous fashion, or more practically by using a series of spanwise flap segments; with each flap segment being individually controllable in angle-of-deflection to contain the vortex circulation in front of the forward facing surface of the aft-flap segment 24. Through proper selection of flap chord lengths and flap angle-of-deflection, for the fore-flap and aft-flap segments, a smaller and lighter leading edge flap system for a sharp leading edge airfoil section can be derived that will produce the desired aerodynamic performance and be capable of efficient utilization over a wider range of aircraft angle-of-attack than is possible by present known leading edge flap systems. With a continuous spanwise vortex circulation, most of the loss in leading edge thrust that a sharp leading edge type of wing airfoil section would normally experience, would be avoided; i.e., a wing, with a large radius or rounded leading edge, which was flown so that no flow separated, would be best, or 100% efficient with respect to generating leading edge suction and reducing drag. The continuous spanwise vortex circulation, if achieved, would produce nearly 100% efficiency.

If airflow or pressure sensing systems are employed for detecting and stabilizing an established vortex circulation flow, through a continuous flap angle-of-deflection adjusting procedure while the aircraft is in flight, then this combination would be defined as an aircraft primary control system and as such would make the overall system much more complicated. In general, high-lift devices are principally designed to work at certain predetermined angles-of-attack and for other angles-of-attack they may offer a detriment. Therefore, the vortex generating devices of the herein disclosed embodiments of the invention, are sized and positioned at angles-of-deflection that are determined through wind tunnel and flight tests, to assure that an established vortex circulation will remain close to the flap surface area, for the range of angles-of-attack that the aircraft is to be operated at during takeoff and landing operations.

Aerodynamic wind tunnel tests, of the vortex flow induced leading edge flap of the present invention, have indicated substantially improved airflow characteristics over the upper surface of a wing airfoil section. Various leading edge vortex flap configurations were tested with results that indicated improved airflow, even with a constant chord vortex flap and a constant chord main flap. However, greater aerodynamic improvements were attributable to spanwise tapered flap segments having an increase in chord length in an outboard direction. These spanwise tapered flap segments were more efficient in containing the conically expanding vortex circulation on to the forward facing aft-flap 24 and for aiding the streamwise airflow to re-attach itself onto the upper surface of the wing, immediately adjacent the wing-to-flap juncture or knee 26. Further aerodynamic improvements were noted with an increase in the angle-of-deflection of the aft-flap 24 at spanwise stations proceeding outboard toward the wing tip.

Figure 4A:
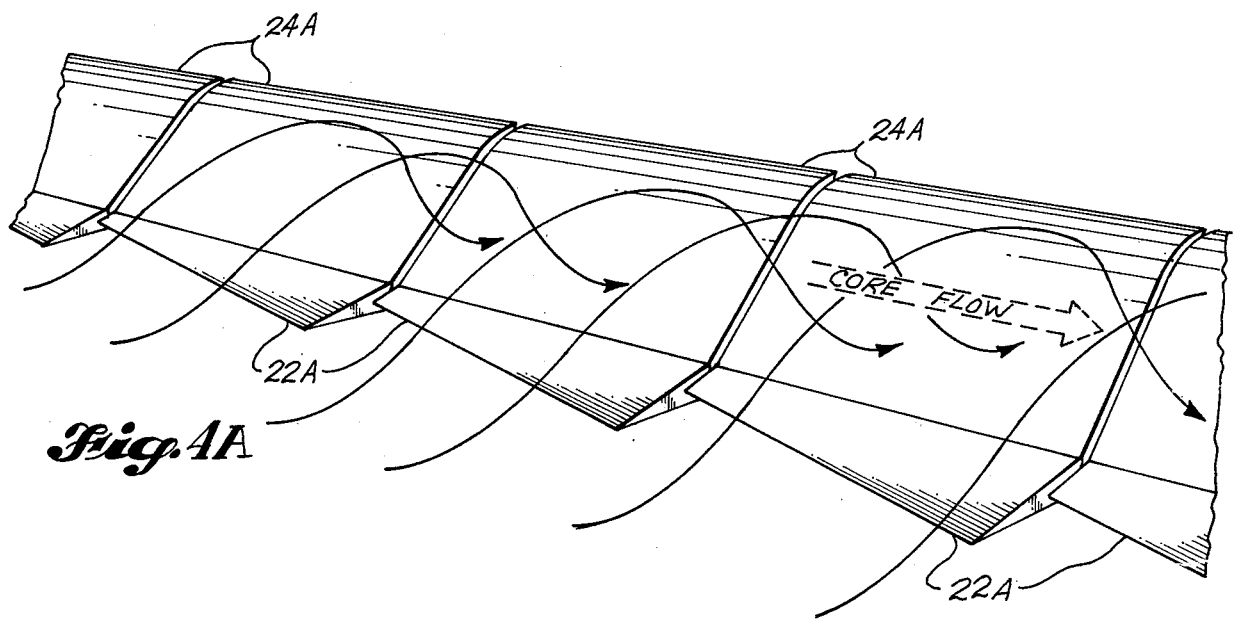
FIG. 4A is a front perspective view of another embodiment showing a saw-toothed leading edge flap system for producing a spiral vortex in a spanwise outboard direction, similar to that shown in FIG. 4.

FIG. 4A is another embodiment depicting a variation in the leading edge flap system shown in FIG. 4; wherein, the individual spanwise segments of the fore-flap 22A are separately tailored and sized with a tapered and increasing chord length, in a spanwise outboard direction. The step-tapered or saw-toothed leading edge, will produce a spiral vortex in a streamwise direction, between the flap segments, which vortex will partially shed back over the upper surface of the wing. Thereby, making room for additionally induced vortex circulation starting at the next adjacent flap segment outboard. The total strength from the forward thrust effect of the low pressure region contained on the upper surface of the forward facing aft-flap 24A, will be reduced; because, each of the spanwise tapered fore-flap segments 22A will have to freshly reinforce the vortex circulation. So, the overall beneficial effect may be reduced from what it could be if the vortex circulation were not partially shed spanwise, but large scale vortex breakdown over the wing upper surface could be postponed to higher angles of attack.

FIG. 5 is a top plan view, depicting one-half of the low aspect ratio, swept back-wing, supersonic fighter type airplane shown in FIG. 1.

FIG. 6 is a cross-sectional view of the wing taken in the direction 6—6 indicated in FIG. 5 and shows the leading edge flap deflected downward at an angle of thirty degrees, and the trailing edge flap deflected downward at an angle of fifteen degrees.

FIG. 7 is a pressure graph of the airflow over the airfoil section of the wing indicated in FIG. 6 and shows the aerodynamic results obtained from wind tunnel tests at the relatively low speed of M=0.2 with the wing at several different angle-of-attack positions. The cross-sectional view of FIG. 6 can be considered as being superimposed onto the pressure graph of FIG. 7; so, that when the two figures are viewed in combination, they form a clearer understanding of what the different lines of the pressure pattern actually represent with respect to the wing airfoil section.

It was discovered that when the spanwise segments of the leading edge flap are deflected downward at certain angles, that a large negative pressure region formed on the forward facing surface of said flap; and that a reduced pressure region acted in a thrust direction which resulted in reduced drag. This discovery formed the basis for believing that a vortex airflow circulation region does lay or can lay along the forward facing surface of a downward deflected flap segment: and that this circulating vortex can, to some extent, simulate a large rounded leading edge for the wing airfoil section. Also, the leading edge suction characteristics normally attributable to a large rounded leading edge, appears to have been replaced by the vortex flow and therefore the drag characteristics are kept low.

Referring to the plotted pressure pattern, shown in FIG. 7, for the wing at an angle-of-attack of approximately eight degrees, it will be noted that the streamwise airflow remains substantially attached to the upper surface contour of the leading edge flap 24 and the upper surface of the wing airfoil section; and this attached airflow prevails with the fore-flap segment 22 remaining in chordwise alignment with the aft-flap 24, as shown in FIG. 6. The sharp rising peak represents the aiflow pressure at the knee 26 between the leading edge flap and the wing.

Referring to the plotted pressure pattern for the wing at an angle-of-attack of thirteen degrees and with the leading edge flap 21 deflected downward at an angle of 30 degrees (as shown in FIG. 6), test results show that a very low pressure region, generally associated with a vortex airflow circulation, develops on the forward facing surface of the leading edge flap; and that this vortex functions to induce initial separation of the oncoming streamwise airflow at the sharp leading edge of the flap as indicated by the peak negative pressure in FIG. 7. The sharp negative slope of the plotted pressure line indicates that this vortex airflow circulation has established itself on the forward facing surface of the leading edge flap; even though, the fore-flap segment 22 is not deflected upward with respect to the aft-flap 24; but, as shown in FIG. 6 said flap segments are in chordwise alignment. Further, the plotted pressure pattern indicates a trapped vortex airflow circulation region, because the pressure at the wing-flap juncture or knee 26 almost returns to what it was when the streamwise airflow remained attached as depicted by the position of the pressure line for the wing at eight degrees angle-of-attack. When a vortex forms, the induced circulation effect of the vortex, further reduces the pressure inside the core of the vortex; and in so doing, causes the external streamwise airflow to reattach itself to the upper surface of the wing immediately adjacent to the wing-flap juncture or knee 26 and remain attached over the remaining wing surface.

Referring to the plotted pressure pattern for the wing at an angle-of-attack of seventeen degrees, the pressure pattern past the wing-flap juncture or knee 26 indicates that the circulation of the vortex has now spilled over onto the upper surface of the wing, as opposed to being contained on the forward facing surface of the deflected flap, and a relatively large negative pressure region has been created over the upper surface of the wing.

A comparison of the plotted pressure patterns for the wing at eight degrees and thirteen degrees, indicates that a higher pressure, in a positive sense, is created in front of the flap when the wing is at eight degrees, than when it is increased to a takeoff attitude of approximately thriteen degrees. At thirteen degrees, the pressure is low over the upper surface of the flap which indicates that a forward thrust effect takes place and that the drag is significantly reduced. When the overall force characteristics of the wing are measured in wind tunnel tests, this improved drag characteristic at thirteen degrees is evident and is a prime element in the improved performance for this particular wing airfoil section. However, when the wing is at the higher angle-of-attack of seventeen degrees, the beneficial effect of the low pressure region created by the vortex, is destroyed; because, the low pressure spills over the wing-flap juncture of knee 26 and onto the upper surface of the wing. This increase in area of the low pressure region causes separation of the streamwise airflow from the wing upper surface and results in increased drag. Therefore, it was determined that only by maintaining a circulating vortex on the forward facing surface of the deflected flap and preventing it from spilling over onto the upper surface of the wing, could the wing drag characteristics be significantly improved.

Although the phenomenon of the vortex circulation exists on the flap at a wing angle-of-attack of thirteen degrees without the fore-flap segment 22 being deflected upward, it is the object of this invention to increase the effectiveness of the trapped vortex by controlling at what angle-of-attack the vortex will form as well as the range of angles-of-attack that the vortex will remain trapped on the forward facing surface of the flap. With the vortex flap deflected upward relative to the main flap, the beneficial effect of a large negative pressure region on the forward facing flap surface, as indicated in FIG. 7 by the wing angle-of-attack of thirteen degrees, can also be created at the lower wing angle-of-attack of eight degrees, i.e., by the proper utilization of the vortex flap, it is possible to increase the range of wing angles-of-attack over which the beneficial effect of a trapped vortex airflow circulation region can exist.

Although the various embodiments of this invention are particularly adaptable to highly swept-back leading edge wings where inherently there is a substantial spanwise airflow generated along the leading edge, it is contemplated that this invention could also be applicable to a wing having a less swept-back leading edge; and can even be adapted to a straight leading edge wing, provided that spanwise blowing is introduced into the vortex circulation core, so that the vortex does not spill over the forward facing surface of the flap segment and onto the upper surface of the wing.

Referring to FIGS. 3, 4, 4A and assuming that the flap segments form an unswept leading edge of a wing, for each of the spanwise flap segments, a jet nozzle or a series of jet nozzles should be located so as to direct a jet of pressurized fluid at the core of the vortex. As shown in the end view of FIG. 3, the core of the vortex is approximately one-third of the distance up from the intersection of the fore-flap 22 with the aft-flap 24, on the forward facing surface of the aft-flap 24.

FIG. 8 shows another embodiment of the invention applicable to a wing 40 having a relatively round leading edge, as opposed to the very sharp leading edge shown in FIGS. 1–6, and with a retractable leading edge flap 41 shown hinged at 45 to wing structure and extended from the lower surface thereof to a forward and downward operative position. The flap 41 comprises panel 44 and a bullnose member 42 hinged at 43 thereto. In the extended position shown, the flap panel 44 is shown as a flexible panel with reverse curvature and bullnose 42 is rotated additionally so that the combination appears as a reversed variable camber type flap. This flap relationship creates a recessed area or trap 46 that contains the vortex circulation better than if a flat surface Kruger type flap were used. If a vortex airflow circulation region can be established and maintained, in the same general location forward of the wing leading edge as shown in FIG. 3, the vortex will cause an acceleration of the free-stream airflow as it passes up over the leading edge of the relatively fixed wing section, then the possibility of airflow separation beyond the flap would be suppressed.

FIG. 9 shows another embodiment wherein a wing 50 has a rounded leading edge; and a forward section of the wing is rotated downward about a hinge 52, to form a drooped wing leading edge section 51. The drooped wing section 51, having a rounded leading edge, is desensitized to the formation of a vortex; and if a vortex should happen to form thereon, it would not be stable, nor would it be maintained on the forward facing surface thereof.

A relatively large rounded leading edge, on a conventional type of retractable flap which is generally stowed in the undersurface of the wing leading edge, will also have an inherent tendency, when the flap is in an operative forwardly extended position, to keep the streamwise airflow attached to the upper surface of said flap. Therefore, in the FIG. 9 embodiment, a spoiler 53 is hinged at 54 to the leading edge of the drooped wing section 51 and is employed for tripping the streamwise airflow and causing a separation thereof. The spoiler 53 also functions as a triggering device for producing a circulating vortex flow on the forward facing surface of the drooped wing section 51, which vortex flow will cause the streamwise airflow to separate in the manner as previously described.

In addition, in the FIG. 9 embodiment there is intended to be a series of nozzles 57 arranged in a spanwise direction (not shown) and said nozzles are to be uncovered with the extension of the spoiler 53 into the streamwise airflow. Also, a jet of pressurized fluid is to be exhausted from the nozzles 57, which are located at the hinged juncture 54 of the spoiler to flap segment, to aid in producing a vortex circulation. The spoiler 53 is tailored and sized with a spanwise tapering, chord length (not shown) for a more efficient control over the circulating vortex flow on the forward facing surface of the flap segment 51, in a manner similar to that previously described and shown in FIGS. 4 and 4A with respect to the fore-flap segments 22 and 22A respectively.

FIG. 10 shows another embodiment wherein a vortex generating air-jet is used as a trigger to trip the streamwise airflow over a rounded leading edge of a drooped wing section and cause a separation of the streamwise airflow over the forward facing surface thereof in a manner as previously described with respect to FIG. 9.

While the invention has been disclosed with reference to preferred embodiments, it is to be understood that those modifications and changes which become obvious to a person skilled in the art to which this invention pertains, as a result of the teachings hereof, are considered to be encompassed by the following claims.

We claim:

1. Apparatus for streamwise airflow control over the upper surface of an airfoil, comprising: said airfoil having a drooped leading edge segment; and means mounted forward on said drooped leading edge segment for generating a vortex airflow circulation on the forward facing surface of said drooped leading edge segment; said drooped leading edge segment being positioned at a forward and downward angle-of-deflection relative to said airfoil for confining said vortex airflow circulation to the forward facing surface area of said drooped leading edge segment, so as to control both the separation of the streamwise airflow and its re-attachment to the upper surface of the airfoil, downstream of said drooped leading edge segment.

2. Apparatus for streamwise airflow control over the upper surface of an airfoil, comprising: said airfoil having a chordplane and a segmented leading edge section comprising a fore-flap segment and an aft-flap segment; said aft-flap segment having a chordplane and being positioned at a forward and downward angle-of-deflection relative to said airfoil chordplane; and said fore-flap segment being positioned at a forward and upward angle-of-deflection relative to the chordplane of said aft-flap segment, for creating a vortex in front of said aft-flap segment to control separation of the streamwise airflow and its re-attachment to the upper surface of the airfoil, downstream of said aft-flap segment.

3. Apparatus for controlling separation of streamline airflow across the upper surface of an airfoil, comprising: said airfoil being constructed with a series of chordwise segments for forming a forward and downward angle-of-deflection leading edge device; said leading edge device having a chordplane and comprising a leading edge segment positioned at an upward angle-of-deflection relative to said chordplane, for generating a vortex airflow circulation along the forward facing surface of said downward deflected leading edge device; and said leading edge segment functioning to enhance vortex entrapment in front of said downward deflected leading edge section for triggering separation of the streamline airflow and its re-attachment to the upper surface of the airfoil, downstream of said leading edge device.

4. A method for controlling streamwise airflow over the upper surface of an airfoil, comprising: segmenting chordwise the construction of the airfoil for forming a drooped leading edge segment; positioning a vortex generating means forward on said drooped leading edge segment for creating a vortex airflow circulation on the forward facing surface of said leading edge segment; triggering separation of the streamwise airflow in front of said leading edge segment by said vortex flow; controlling re-attachment of said separated streamwise airflow to the upper surface of said airfoil downstream chordwise of said leading edge segment, by drooping said leading edge segment to a predetermined angle-of-deflection for confining the vortex flow region within the forwardly facing surface area of said drooped leading edge segment.

5. Apparatus for streamline airflow control over the upper surface of an airfoil, comprising: a double flap having a fore-flap and an aft-flap, and being positioned at a forward and downward angle-of-deflection from the leading edge of said airfoil; said fore-flap being positioned at a forward and upward angle-of-deflection relative to said aft-flap for producing a vortex airflow circulation in front of said aft-flap, to control separation of the streamline airflow on the forward facing surface of said aft-flap and re-attachment of said separated streamline airflow to the upper surface of said airfoil.

6. Apparatus for controlling separation of streamline airflow over the leading edge of an airfoil having a chordplane, comprising: a double flap, having a fore-flap and an aft-flap; said fore-flap and said aft-flap, each having a chordplane and being mounted from the leading edge of said airfoil at a forward and downward angle-of-deflection relative to said airfoil chordplane; and said fore-flap having its chordplane inclined upwardly relative to said aft-flap chordplane, for creating a vortex flow ahead of said aft-flap to induce separation of streamline airflow and control re-attachment of the streamline airflow, downstream chordwise of said double flap, to the upper surface of said airfoil.

7. A method for controlling streamline airflow over the upper surface of an airfoil having a chordplane, comprising: positioning a double flap comprising a fore-flap and an aft-flap, from the leading edge of said airfoil at a downward angle-of-deflection relative to said airfoil chordplane; positioning said fore-flap at an upward angle-of-deflection relative to said aft-flap, for generating a vortex airflow circulation in front of said aft-flap; triggering separation of the streamline airflow in front of said aft-flap by said vortex flow; and controlling re-attachment of said separated streamline airflow, downstream chordwise of said double flap, to the upper surface of said airfoil, by confining said vortex flow within the forward facing surface area of said downward deflected aft-flap.

8. Apparatus for controlling separation of streamline airflow over the leading edge of an airfoil having a chordplane, comprising: a flap mounted from the leading edge of said airfoil and positioned at a forward and downward angle-of-deflection relative to said airfoil chordplane; and a spoiler pivotally connected forward on said flap and positioned to project above the upper surface of said flap for creating a vortex airflow circulation on the forward facing upper surface of said flap, to induce separation of streamline airflow and control re-attachment of the streamline airflow, downstream chordwise of said flap, to the upper surface of said airfoil.

9. Apparatus for controlling separation of streamline airflow over the leading edge of an airfoil having a chordplane, comprising: said airfoil being segmented chordwise for forming a movable leading edge segment positioned at a forward and downward angle-of-deflection relative to said airfoil chordplane; a spoiler retractably mounted forward on said leading edge segment and extendable to an upward angle-of-deflection relative to said leading edge segment, for projecting into the streamline airflow and creating a vortex airflow circulation, on the forward facing surface of said downward deflected leading edge segment, to induce separation of the streamline airflow in front of said leading edge segment; said spoiler and said leading edge segment, being positioned at a predetermined angle-of-deflection relative to said airfoil chordplane for maintaining said vortex airflow circulation substantially within the region of the forward facing surface area of said leading edge segment and thereby controlling re-attachment of said separated streamline airflow to the upper surface of said airfoil, downstream chordwise of said leading edge segment.

10. A method for controlling streamwise airflow over the upper surface of an airfoil having a chordplane, comprising: segmenting chordwise a leading edge portion of the airfoil for forming a movable leading edge segment; positioning said leading edge segment at a forward and downward angle-of-deflection relative to said airfoil chordplane; connecting a spoiler forward on said leading edge segment; positioning said spoiler at an upward angle-of-deflection relative to said leading edge segment, for projecting into the streamwise airflow and creating a vortex circulation airflow on the forward facing surface of said downward deflected leading edge segment, for inducing separation of the streamwise airflow in front of said leading edge segment; and maintaining said vortex flow region substantially on the forward facing surface area of said leading edge segment, by positioning said spoiler and said leading edge segment, in combination, at a predetermined angle-of-deflection relative to said airfoil chordplane, for controlling re-attachment of said separated streamwise airflow to the upper surface of said airfoil, downstream chordwise of said deflected leading edge segment.

11. A method for controlling streamwise airflow over the upper surface of an airfoil having a chordplane, comprising: segmenting chordwise the leading edge portion of the airfoil for forming a movable leading edge spanwise segment; positioning said leading edge spanwise segment at a forward and downward angle-of-deflection relative to said airfoil chordplane; mounting a spanwise series of nozzles forward on said leading edge spanwise segment; blowing a fluid jet stream from said nozzles to produce a vortex circulation airflow on the forward facing upper surface of said downward deflected leading edge spanwise segment, for inducing separation of the streamwise airflow in front of said leading edge spanwise segment; and controlling re-attachment of said separated streamwise airflow to the upper surface of said airfoil, downstream of said leading edge spanwise segment, by maintaining said vortex flow region substantially within the forward facing surface area of said leading edge spanwise segment.

12. A method for controlling streamwise airflow over the upper surface of an airfoil having a chordplane, comprising: segmenting chordwise a leading edge portion of said airfoil for forming a fore-segment and an aft-segment; positioning said aft-segment at a forward and downward angle-of-deflection relative to said airfoil chordplane; positioning said fore-segment at a forward and upward angle-of-deflection relative to said aft-segment; installing a fluid jet spoiler, comprising a spanwise series of nozzles, in the lower portion of the forward facing surface of said aft-segment; blowing a fluid jet stream from said spanwise series of nozzles in a forward direction onto the upper surface of said fore-segment; producing a vortex airflow circulation, by the combined action of said fluid jet spoiler and said deflected fore-segment, on the forward facing surface of said downward deflected aft-segment, to induce separation of the streamwise airflow in front of said aft-segment; positioning the combination of said fluid jet spoiler and said fore-segment and aft-segment, at a predetermined angle-of-deflection relative to said airfoil chordplane for maintaining said vortex airflow circulation in a region substantially within the forward facing surface area of said aft-segment and thereby controlling re-attachment of said separated streamwise airflow to the upper surface of said airfoil, downstream chordwise of said aft-segment.

13. Apparatus for controlling streamwise airflow over the upper surface of an airfoil having a chordplane, comprising: said airfoil being constructed with a leading edge segment; said leading edge segment having a chordplane and being operatively positioned at a forward and downward angle-of-deflection relative to said airfoil chordplane; a fluid jet spoiler comprising a spanwise series of nozzles mounted forward on said leading edge segment for blowing a pressurized fluid jet stream in a generally forward and upward direction relative to said leading edge segment chordplane, and producing a vortex airflow circulation on the forward facing surface of said downward deflected leading edge segment for inducing separation of the streamwise airflow in front of said leading edge segment; said leading edge segment and said fluid jet spoiler, each being positioned at a predetermined angle-of-deflection relative to said airfoil chordplane for maintaining said vortex airflow circulation in a region substantially within the forward facing surface area of said leading edge segment and thereby controlling re-attachment of said separated streamwise airflow to the upper surface of said airfoil, downstream chordwise of said leading edge segment.

14. Apparatus for streamline airflow control over the upper surface of an airfoil having a chordplane, comprising: said airfoil comprising a chordwise segmented leading edge portion for forming a movably interconnected fore-segment and aft-segment, leading edge flap; said leading edge flap being operatively positioned at a forward and downward angle-of-deflection relative to said airfoil chordplane; said fore-segment being operatively positioned at a forward and upward angle-of-deflection relative to said aft-segment; a fluid jet spoiler comprising a spanwise series of nozzles being mounted forward on the upper surface of said aft-segment for blowing a pressurized fluid jet stream from said nozzles at a generally forward and upward angle-of-deflection relative to said aft-segment; said fluid jet spoiler producing a vortex airflow circulation, on the forward facing upper surface of said downward deflected aft-segment, for inducing separation of the streamline airflow in front of said aft-segment; said fluid jet spoiler and said fore-segment, each being positioned at a predetermined angle-of-deflection for maintaining said vortex airflow circulation in a region substantially within the forward facing surface area of said aft-segment and thereby controlling re-attachment of said separated streamline airflow to the upper surface of said airfoil, downstream chordwise of said aft-segment.

15. Apparatus for controlling streamwise airflow over the upper surface of an airfoil having a chordplane, comprising: said airfoil comprising a chordwise segmented leading edge portion for forming a movably connected leading edge segment; said leading edge segment being operatively positioned at a forward and downward angle-of-deflection relative to said airfoil chordplane; a spoiler member pivotally connected forward on said leading edge segment and being operatively positioned to project above the upper surface of said leading edge segment; a fluid jet spoiler comprising a spanwise series of nozzles mounted forward on said leading edge segment for blowing a pressurized fluid jet stream from said nozzles at a generally forward and upward angle-of-deflection relative to said leading edge segment; said fluid jet spoiler and said spoiler member, in combination, producing a vortex airflow circulation on the forward facing upper surface of said downward deflected leading edge segment, for separating the streamwise airflow in front of said leading edge segment and inducing re-attachment of said separated streamwise airflow, to the upper surface of said airfoil, downstream chordwise of said deflected leading edge segment.

16. Apparatus for streamwise airflow control over the upper surface of a wing having a swept-back leading edge, comprising: said wing having a chordplane and being constructed with a spanwise series of leading edge segments; each of said spanwise segments comprising a fore-flap segment and an aft-flap segment; each of said aft-flap segments having a chordplane and being positioned at a forward and downward angle-of-deflection relative to said airfoil chordplane; and each of said fore-flap segments being positioned at a forward and upward angle-of-deflection relative to the chordplane of each of said aft-flap segments, for creating a vortex airflow circulation along the forward facing surface of said downward deflected aft-flap segments and for inducing separation of the streamwise airflow in front of said aft-flap segments; said swept-back wing leading edge producing a spanwise flow of said vortex airflow circulation toward the wing tip; said aft-flap segments having an increase in chord length in a spanwise outboard direction for containing a conically expanding spanwise vortex on the forward facing surface of said downward deflected aft-flap segments and thereby controlling re-attachment of said separated streamline airflow to the upper surface of said wing, downstream chordwise of said aft-flap segments.

17. Apparatus for controlling separation of streamline airflow across the upper surface of a wing having a swept-back leading edge, comprising: said wing having a chordplane and being constructed with a spanwise series of leading edge segments; said leading edge segments being operatively positioned at a forward and downward angle-of-deflection relative to said wing chordplane; means mounted to the forward edge of said leading edge segments for generating a vortex airflow circulation along the forward facing surface of said downward deflected leading edge segments and for inducing separation of the streamline airflow in front of said leading edge segments; said swept-back wing leading edge producing a spanwise flow of said vortex airflow circulation toward the wing tip; said leading edge segments having an increase in chord length in a spanwise outboard direction for containing a conically expanding spanwise vortex on the forward facing surface of said downward deflected leading edge segments and thereby controlling re-attachment of said separated streamline airflow to the upper surface of said wing, downstream chordwise of said leading edge segments.

18. A method for controlling streamwise airflow over the upper surface of a wing having a chordplane and a swept-back leading edge, comprising: constructing the swept-back leading edge portion of said wing into a spanwise series of movable leading edge segments; operatively positioning said leading edge segments at a forward and downward angle-of-deflection relative to said wing chordplane; mounting a vortex generating means forward on said downward deflected leading edge segments for creating a vortex airflow circulation along the forward facing surface of said downward deflected leading edge segments; triggering separation of the streamwise airflow in front of said leading edge segments by said vortex flow; producing a spanwise flow of said vortex airflow circulation toward the wing tip by the degree of sweep-back of said wing leading edge; increasing the chord length of said leading edge segments in a spanwise outboard direction for containing a conically expanding spanwise vortex within the forward facing surface area of said downward deflected leading edge segments; and thereby, controlling re-attachment of said separated streamwise airflow to the upper surface of said wing, downstream chordwise of said leading edge segments.

19. Apparatus for streamline airflow control over the upper surface of a wing having a swept-back leading edge, comprising: a double segment flap having a fore-flap segment and an aft-flap segment, and being positioned at a forward and downward angle-of-deflection from the leading edge of said wing; said fore-flap segment having its trailing edge hinged to the leading edge of said aft-flap segment and being positioned at a forward and upward angle-of-deflection relative to said aft-flap segment for producing a vortex airflow circulation in front of said aft-flap segment and for inducing separation of the streamline airflow in front of said aft-flap segment; said swept-back wing leading edge producing a spanwise flow of said vortex airflow circulation toward the wing tip; said aft-flap segment having an increase in chord length in a spanwise outboard direction for containing a conically expanding spanwise vortex on the forward facing surface of said downward deflected aft-flap segment and thereby controlling re-attachment of said separated streamline airflow to the upper surface of said wing, downstream chordwise of said double segment flap.

20. Apparatus for controlling separation of streamline airflow over a swept-back leading edge of a wing having a chordplane, comprising: a double segment flap, having a fore-flap segment and an aft-flap segment; said aft-flap segment being mounted from the leading edge of said wing at a forward and downward angle-of-deflection relative to said wing chordplane; said fore-flap segment having a trailing edge hingedly connected to a leading edge of said aft-flap segment and having a chordplane inclined upwardly relative to a chordplane of said aft-flap segment for creating a vortex flow ahead of said aft-flap segment to induce separation of streamline airflow in front of said aft-flap segment; said swept-back wing leading edge producing a spanwise flow of said vortex airflow circulation toward the wing tip; said aft-flap segment having an increase in chord length in a spanwise outboard direction for containing a conically expanding spanwise vortex on the forward facing surface of said downward deflected aft-flap segment and thereby controlling re-attachment of said separated streamline airflow to the upper surface of said wing, downstream chordwise of said double segment flap.

21. A method for controlling streamline airflow over the upper surface of a wing having a chordplane and a swept-back leading edge, comprising: constructing the swept-back leading edge portion of said wing for housing a spanwise series of movable, double chordwise segment flaps; operatively positioning said double chordwise segment flaps, comprising a fore-flap segment and an aft-flap segment, from the swept-back leading edge of said wing at a forward and downward angle-of-deflection relative to said wing chordplane; positioning said fore-flap segments at an upward angle-of-deflection relative to said aft-flap segments, for generating a vortex airflow circulation along the forward facing surface of said downward deflected aft-flap segments; triggering separation of the streamline airflow in front of said aft-flap segments by said vortex flow; producing a spanwise flow of said vortex airflow circulation towards the wing tip by the degree of sweep-back of said wing leading edge; increasing the chord length of said aft-flap segments in a spanwise direction outboard for confining a conically expanding spanwise vortex within the forward facing surface area of said downward deflected aft-flap segments; and thereby, controlling re-attachment of said separated streamline airflow to the upper surface of said wing, downstream chordwise of said double chordwise segment flaps.

22. Apparatus for controlling separation of streamline airflow over a swept-back leading edge of a wing having a chordplane, comprising: a flap mounted from the leading edge of said wing and positioned at a forward and downward angle-of-deflection relative to said wing chordplane; a spoiler pivotally connected forward on said flap and positioned to project above the upper surface of said flap for creating a vortex airflow circulation on the forward facing upper surface of said flap, to induce separation of streamline airflow; said swept-back wing leading edge producing a spanwise flow of said vortex airflow circulation toward the wing tip; said flap having an increase in chord length in a spanwise outboard direction; said spoiler and said flap, being positioned at a predetermined angle-of-deflection relative to said wing chordplane for containing a conically expanding spanwise vortex substantially within the region of the forward facing surface area of said downward deflected flap and thereby, controlling re-attachment of said separated streamline airflow to the upper surface of said wing, downstream chordwise of said flap.

23. Apparatus for controlling separation of streamline airflow over a swept-back leading edge of a wing having a chordplane, comprising: said wing being segmented chordwise and forming a spanwise series of leading edge segments; each leading edge segment being positioned at a forward and downward angle-of-deflection relative to said wing chordplane; a spoiler retractably mounted forward on each of said leading edge segments and being extendable to an upward angle-of-deflection relative to each of said leading edge segments, for projecting into the streamline airflow and creating a vortex airflow circulation, on the forward facing surface of each of said downward deflected leading edge segments to induce separation of the streamline airflow in front of said leading edge segments; said swept-back wing leading edge producing a spanwise flow of said vortex airflow circulation toward the wing tip; said leading edge segments having an increase in chord length in a spanwise outboard direction; said spoilers and said leading edge segments, being positioned at a predetermined angle-of-deflection relative to said wing chordplane for containing a conically expanding spanwise vortex substantially within the region of the forward facing surface area of said downward deflected leading edge segments and thereby, controlling re-attachment of said separated streamline airflow to the upper surface of said wing, downstream chordwise of said leading edge segments.

24. A method for controlling streamwise airflow over the upper surface of a wing having a chordplane and a swept-back leading edge, comprising: segmenting chordwise a leading edge portion of the wing and forming a spanwise series of movable leading edge segments; positioning said leading edge segments at a forward and downward angle-of-deflection relative to said wing chordplane; connecting a spanwise series of spoilers forward on said leading edge segments; positioning said spoilers at an upward angle-of-deflection relative to said leading edge segments for projecting into the streamwise airflow and creating a vortex airflow circulation on the forward facing surface of said downward deflected leading edge segments, for inducing separation of the streamwise airflow in front of said leading edge segments; producing a spanwise flow of said vortex airflow circulation toward the wing tip by the degree of sweep-back of said wing leading edge; increasing the chord length of said leading edge segments in a spanwise outboard direction; positioning said spoilers and said leading edge segments, in combination, at a predetermined angle-of-deflection relative to said wing chordplane, for containing a conically expanding spanwise vortex substantially on the forward facing surface area of said downward deflected leading edge segments; and thereby controlling re-attachment of said separated streamwise airflow to the upper surface of said wing, downstream chordwise of said deflected leading edge segments.

25. Apparatus for controlling streamwise airflow over the upper surface of a wing having a swept-back leading edge, comprising: said wing having a chordplane and being constructed with a leading edge segment rotatable about a spanwise hingeline; said leading edge segment having a chordplane and being rotatively positioned to a forward and downward angle-of-deflection relative to said wing chordplane; a fluid jet spoiler comprising a spanwise series of nozzles mounted forward on said leading edge segment for blowing a fluid jet stream in a generally forward and upward direction relative to said leading edge segment chordplane, and producing a vortex airflow circulation on the forward facing surface of said downward deflected leading edge segment for inducing separation of the streamwise airflow in front of said leading edge segment; said swept-back wing leading edge producing a spanwise flow of said vortex airflow circulation toward the wing tip; said leading edge segment having an increase in chord length in a spanwise outboard direction for containing a conically expanding spanwise vortex substantially trapped on the forward facing surface of said downward deflected leading edge segment; said leading edge segment and said fluid jet spoiler, each being positioned at a predetermined angle-of-deflection relative to said wing chordplane for maintaining said vortex airflow circulation in a region substantially within the forward facing surface area of said leading edge segment and thereby controlling re-attachment of said separated streamwise airflow to the upper surface of said wing, downstream chordwise of said leading edge segment.

26. A method for controlling streamwise airflow over the upper surface of a wing having a chordplane and a swept-back leading edge, comprising: segmenting chordwise a leading edge portion of the wing for forming a spanwise series of movable leading edge segements having a chordplane; positioning said leading edge segments at a forward and downward angle-of-deflection relative to said wing chordplane; mounting a fluid jet spoiler, comprising a spanwise series of nozzles, forward on said leading edge segments; blowing a fluid jet stream from said nozzles in a generally forward and upward direction relative to said leading edge segment chordplane, and producing a vortex airflow circulation on the forward facing surface of said downward deflected leading edge segments for inducing separation of the streamwise airflow in front of said leading edge segments; producing a spanwise flow of said vortex airflow circulation toward the wing tip by the degree of sweep-back of said wing leading edge; increasing the chord length of said leading edge segments in a spanwise outboard direction; positioning said leading edge segments and said fluid jet spoiler, in combination, at a predetermined angle-of-deflection relative to said wing chordplane, for containing a conically expanding spanwise vortex substantially trapped on the forward facing surface of said downward deflected leading edge segments; and thereby controlling re-attachment of said separated streamwise airflow to the upper surface of said wing, downstream chordwise of said leading edge segments.

27. Apparatus for streamline airflow control over the upper surface of a wing having a swept-back leading edge, comprising: said wing having a chordplane and comprisng a chordwise segmented leading edge portion forming a movably interconnected fore and aft segment, leading edge flap; said aft-flap segment having a chordplane and being operatively positioned at a forward and downward angle-of-deflection relative to said wing chordplane; said fore-flap segment being operatively positioned at a forward and upward angle-of-deflection relative to said aft-flap segment chordplane; a fluid jet spoiler comprising a spanwise series of nozzles mounted forward on the upper surface of said aft-flap segment for blowing a pressurized fluid jet stream in a generally forward direction and at an upward angle-of-deflection relative to said aft-flap segment chordplane; said fluid jet spoiler in combination with said fore-flap segment, producing a vortex airflow circulation, on the forward facing upper surface of said downward deflected aft-flap segment, for inducing separation of the streamline airflow in front of said aft-flap segment; said swept-back wing leading edge producing a spanwise flow of said vortex airflow circulation toward the wing tip; said leading edge flap having an increase in chord length in a spanwise outboard direction; said fluid jet spoiler and said fore-flap segment, each being positioned at a predetermined angle-of-deflection for maintaining said vortex airflow circulation in a region substantially within the forward facing surface area of said aft-flap segment and thereby controlling re-attachment of said separated streamline airflow to the upper surface of said wing, downstream chordwise of said aft-flap segment.

28. A method for controlling streamwise airflow over the upper surface of a wing having a chordplane and a swept-back leading edge, comprising: segmenting chordwise the swept-back leading edge portion of said wing for forming a fore-flap segment and an aft-flap segment; operatively positioning said aft-flap segment at a forward and downward angle-of-deflection relative to said wing chordplane; positioning said fore-flap segment at a forward and upward angle-of-deflection relative to said aft-flap segment; installing a fluid jet spoiler, comprising a spanwise series of nozzles in the lower portion of the forward facing surface of said aft-flap segment; blowing a fluid jet stream from said spanwise series of nozzles in a forward direction onto the upper surface of said fore-flap segment; producing a vortex airflow circulation, by the combined action of said fluid jet spoiler and said deflected fore-flap segment, along the forward facing surface of said downward deflected aft-flap segment; triggering separation of the streamwise airflow in front of said aft-flap segment by said vortex airflow circulation; producing a spanwise flow of said vortex airflow circulation toward the wing tip by the degree of sweep-back of said wing leading edge; increasing the chord length of said aft-flap segment in a spanwise direction outboard for forming a spanwise tapered aft-flap segment; positioning the combination of said fluid jet spoiler and said fore-flap and aft-flap segments, at a predetermined angle-of-deflection relative to said wing chordplane for confining a conically expanding spanwise vortex in a region substantially within the forward facing surface area of said downward deflected aft-flap segment; and thereby, controlling re-attachment of said separated streamwise airflow to the upper surface of said wing, downstream chordwise of said aft-flap segment.

29. Apparatus for controlling streamwise airflow over the upper surface of a wing having a swept-back leading edge, comprising: said wing having a chordplane and comprising a chordwise segmented leading edge portion for forming a movably connected leading edge segment; said leading edge segment being operatively positioned at a forward and downward angle-of-deflection relative to said wing chordplane; a spoiler member pivotally connected forward on said leading edge segment and being operatively positioned to project above the upper surface of said leading edge segment; a fluid jet spoiler comprising a spanwise series of nozzles mounted forward on said leading edge segment for blowing a pressurized fluid jet stream in a generally forward direction and at an upward angle-of-deflection relative to said leading edge segment; said fluid jet spoiler and said spoiler member, in combination, producing a vortex airflow circulation on the forward facing upper surface of said downward deflected leading edge segment, for inducing separation of the streamwise airflow in front of said leading edge segment; said swept-back wing leading edge producing a spanwise flow of said vortex airflow circulation toward the wing tip; said leading edge segment having an increase in chord length in a spanwise outboard direction for forming a spanwise tapered leading edge segment; said spoiler member and said leading edge segment, being positioned at a predetermined angle-of-deflection relative to said wing chordplane for containing a conically expanding spanwise vortex substantially within the region of the forward facing surface area of said downward deflected leading edge segment and thereby, controlling re-attachment of said separated streamwise airflow to the upper surface of said wing, downstream chordwise of said leading edge segment.

30. Apparatus for streamline airflow control over the upper surface of an aircraft wing having a chordplane, comprising: said wing having a spanwise leading edge flap positioned at a forward and downward angle-of-deflection relative to said wing chordplane; means mounted spanwise along the forward portion of said downward deflected flap for generating a vortex airflow circulation spanwise along the forward facing surface of said flap to induce separation of the steamline airflow in front of said flap; said flap being positioned at an increasing angle-of-deflection, relative to said wing chordplane, at spanwise stations proceeding outboard toward the wing tip for confining said vortex airflow circulation, in a continuous spanwise fashion, to the forward facing surface area of said downward deflected flap; and thereby controlling re-attachment of said separated streamline airflow to the upper surface of said wing, downstream chordwise of said flap.

31. Apparatus for streamline airflow control over the upper surface of an aircraft wing having a chordplane, comprising: said wing having a chordwise segmented leading edge flap forming a fore-flap segment and an aft-flap segment; said aft-flap segment having a chordplane and being positioned at a forward and downward angle-of-deflection relative to said wing chordplane; said fore-flap segment being positioned at a forward and upward angle-of-deflection relative to the chordplane of said aft-flap segment, for generating a vortex airflow circulation spanwise along the forward facing surface of said aft-flap segment to induce separation of the streamline airflow in front of said leading edge flap; said aft-flap segment being positioned at an increasing angle-of-deflection, relative to said wing chordplane, at spanwise stations proceeding outboard toward the wing tip for confining said vortex airflow circulation, in a continuous spanwise fashion, along the forward facing surface area of said downward deflected aft-flap segment; and thereby controlling re-attachment of said separated streamline airflow to the upper surface of said wing, downstream chordwise of said aft-flap segment.

32. A method for controlling streamwise airflow over the upper surface of an aircraft wing having a chordplane and a swept-back leading edge, comprising: constructing the swept-back leading edge portion of said wing into a spanwise series of movable leading edge segments; operatively positioning said leading edge segments at a forward and downward angle-of-deflection relative to said wing chordplane; mounting a vortex generating means forward on said downward deflected leading edge segments for creating a vortex airflow circulation along the forward facing surface of said downward deflected leading edge segments; triggering separation of the streamwise airflow in front of said leading edge segments by said vortex flow; producing a spanwise flow of said vortex airflow circulation toward the wing tip by the degree of sweep-back of said wing leading edge; positioning said leading edge segments at an increasing angle-of-deflection, relative to said wing chordplane, at spanwise stations proceeding outboard toward the wing tip for containing a conically expanding spanwise vortex airflow circulation along the forward facing surface area of said downward deflected leading edge segments; and thereby, controlling re-attachment of said separated streamwise airflow to the upper surface of said wing, downstream chordwise of said leading edge segments.

33. Apparatus for streamline airflow control over the upper surface of an aircraft wing having a chordplane and a swept-back leading edge, comprising: said wing having a double leading edge flap forming a fore-flap and an aft-flap; said aft-flap being positioned at a forward and downward angle-of-deflection relative to said wing chordplane; said fore-flap being positioned at a forward and upward angle-of-deflection relative to said aft-flap for producing a vortex airflow circulation on the forward facing surface of said aft-flap, to induce separation of the streamline airflow in front of said aft-flap; said swept-back wing leading edge producing a spanwise flow of said vortex airflow circulation toward the wing tip; said aft-flap segment being positioned at an increasing angle-of-deflection, relative to said wing chordplane, at spanwise stations proceeding outboard toward the wing tip for confining said vortex airflow circulation, in a continuous spanwise fashion, to the forward facing surface area of said downward deflected aft-flap segment; and thereby controlling re-attachment of said separated streamline airflow to the upper surface of said wing, downstream chordwise of said aft-flap segment.

34. A method for controlling streamline airflow over the upper surface of a wing having a chordplane and a swept-back leading edge, comprising: constructing the swept-back leading edge portion of said wing for housing a spanwise series of movable, double chordwise segment flaps; operatively positioning said double chordwise segment flaps, comprising a fore-flap segment and an aft-flap segment, from the swept-back leading edge of said wing at a forward and downward angle-of-deflection relative to said wing chordplane; positioning said fore-flap segments at an upward angle-of-deflection relative to said aft-flap segments, for generating a vortex airflow circulation along the forward facing surface of said downward deflected aft-flap segments; triggering separation of the streamline airflow in front of said double chordwise segment flaps by said vortex flow; producing a spanwise flow of said vortex airflow circulation toward the wing tip by the degree of sweep-back of said wing leading edge; positioning said aft-flap segments at an increasing angle-of-deflection, relative to said wing chordplane, at spanwise stations proceeding outboard toward the wing tip for confining a conically expanding spanwise vortex airflow circulation along the forward facing surface area of said downward deflected aft-flap segments; and thereby, controlling re-attachment of said separated streamline airflow to the upper surface of said wing, downstream chordwise of said double chordwise segment flaps.

35. Apparatus for controlling separation of streamline airflow over the leading edge of an aircraft wing having a chordplane, comprising: a flap mounted from the leading edge of said wing and positioned at a forward and downward angle-of-deflection relative to said wing chordplane; and a spoiler pivotally connected forward on said flap and positioned to project above the upper surface of said flap for creating a vortex airflow circulation on the forward facing upper surface of said flap, to induce separation of the streamline airflow in front of said flap; said flap being positioned at an increasing angle-of-deflection, relative to said wing chordplane, at spanwise stations proceeding outboard toward the wing tip for confining said vortex airflow circulation to the forward facing surface area of said downward deflected flap; and thereby controlling re-attachment of said separated streamline airflow to the upper surface of said wing, downstream chordwise of said flap.

36. Apparatus for controlling separation of streamline airflow over the leading edge of an aircraft wing having a chordplane, comprising: said wing being segmented chordwise for forming a movable leading edge segment positioned at a forward and downward angle-of-deflection relative to said wing chordplane; a spoiler retractably mounted forward on said leading edge segment and extendable to an upward angle-of-deflection relative to said leading edge segment, for projecting into the streamline airflow and generating a vortex airflow circulation spanwise along the forward facing surface of said leading edge segment to induce separation of the streamline airflow in front of said leading edge segment; said leading edge segment being positioned at an increasing angle-of-deflection, relative to said wing chordplane, at spanwise stations proceeding outboard toward the wing tip for confining, in combination with said spoiler, said vortex airflow circulation to the forward facing surface area of said downward deflected leading edge segment; and thereby controlling re-attachment of said separated streamline airflow to the upper surface of said wing, downstream chordwise of said leading edge segment.

37. A method for controlling streamline airflow over the upper surface of a wing having a chordplane and a swept-back leading edge, comprising: segmenting chordwise a leading edge portion of the wing for forming a spanwise series of movable leading edge segments; positioning said leading edge segments at a forward and downward angle-of-deflection relative to said wing chordplane; connecting a spanwise series of spoilers forward on said spanwise series of leading edge segments; positioning said spoilers at an upward angle-of-deflection relative to said leading edge segments for projecting into the streamline airflow and generating a vortex airflow circulation spanwise along the forward facing surfaces of said downward deflected leading edge segments to induce separation of the streamline airflow in front of said leading edge segments; producing a spanwise flow of said vortex airflow circulation toward the wing tip by the degree of sweep-back of said wing leading edge; positioning said spoilers and said leading edge segments, in combination, at an increasing angle-of-deflection relative to said wing chordplane, at spanwise stations proceeding outboard toward the wing tip for confining a conically expanding spanwise vortex airflow circulation substantially on the forward facing surface area of said downward deflected leading edge segments; and thereby, controlling re-attachment of said separated streamline airflow to the upper surface of said wing, downstream chordwise of said deflected leading edge segments.

38. Apparatus for controlling streamwise airflow over the upper surface of aircraft wing having a chordplane, comprising: said wing being constructed with a leading edge spanwise segment; said leading edge spanwise segment having a chordplane and being operatively positioned at a forward and downward angle-of-deflection relative to said wing chordplane; a fluid jet spoiler comprising a spanwise series of nozzles mounted forward on said leading edge spanwise segment for blowing a pressurized fluid jet stream in a generally forward and upward direction relative to said leading edge spanwise segment chordplane, and producing a vortex airflow circulation on the forward facing surface of said downward deflected leading edge spanwise segment to induce separation of the streamwise airflow in front of said leading edge spanwise segment; said leading edge spanwise segment being positioned at an increasing angle-of-deflection, relative to said wing chordplane, at spanwise stations proceeding outboard toward the wing tip for confining, in combination with said fluid jet spoiler, said vortex airflow circulation in a region substantially within the forward facing surface area of said leading edge spanwise segment and thereby controlling re-attachment of said separated streamwise airflow to the upper surface of said wing, downstream chordwise of said leading edge spanwise segment.

39. A method for controlling streamwise airflow over the upper surface of a wing having a chordplane and a swept-back leading edge, comprising: segmenting chordwise a leading edge portion of the wing for forming a spanwise series of movable leading edge segments; positioning said leading edge segments, having a chordplane, at a forward and downward angle-of-deflection relative to said wing chordplane; mounting a fluid jet spoiler, comprising a spanwise series of nozzles, forward on said leading edge segments; blowing a fluid jet stream from said nozzles in a generally forward and upward direction relative to said leading edge segment chordplane for producing a vortex airflow circulation on the forward facing surface of said downward deflected leading edge segments to induce separation of the streamwise airflow in front of said leading edge segments; producing a spanwise flow of said vortex airflow circulation toward the wing tip by the degree of sweep-back of said wing leading edge; positioning said leading edge segments at an increasing angle-of-deflection, relative to said wing chordplane, at spanwise stations proceeding outboard toward the wing tip for confining a conically expanding spanwise vortex airflow circulation along the forward facing surface of said downward deflected leading edge segments, and thereby, controlling re-attachment of said separated streamwise airflow to the upper surface of said wing, downstream chordwise of said leading edge segments.

40. Apparatus for streamline airflow control over the upper surface of an aircraft wing having a chordplane, comprising: said wing comprising a chordwise segmented leading edge portion for forming a leading edge flap having movably interconnected fore-segment and aft-segment; said flap being operatively positioned at a forward and downward angle-of-deflection relative to said wing chordplane; said fore-segment being operatively positioned at a forward and upward angle-of-deflection relative to said aft-segment; a fluid jet spoiler comprising a spanwise series of nozzles being mounted forward on the upper surface of said aft-segment for blowing a fluid jet stream from said nozzles at a generally forward and upward angle-of-deflection relative to said aft-segment; said fluid jet spoiler in combination with said fore-segment, producing a vortex airflow circulation on the forward facing upper surface of said downward deflected aft-flap segment for inducing separation of the streamwise airflow in front of said flap; said aft-segment being positioned at an increasing angle-of-deflection, relative to said wing chordplane, at spanwise stations proceeding outboard toward the wing tip for confining, in combination with said fluid jet spoiler and said fore-segment, said vortex airflow circulation along the forward facing surface area of said downward deflected aft-segment; and thereby controlling re-attachment of said separated streamline airflow to the upper surface of said wing, downstream chordwise of said aft-segment.

41. A method of controlling streamwise airflow over the upper surface of a wing having a chordplane and a swept-back leading edge, comprising: segmenting chordwise the swept-back leading edge portion of said wing for forming a fore-flap segment and an aft-flap segment; operatively positioning said aft-flap segment at a forward and downward angle-of-deflection relative to said wing chordplane; positioning said fore-flap segment at a forward and upward angle-of-deflection relative to said aft-flap segment; installing a fluid jet spoiler, comprising a series of nozzles spanwise along the lower portion of the forward facing surface of said aft-flap segment; blowing a fluid jet stream from said spanwise series of nozzles in a forward direction onto the upper surface of said fore-flap segment; producing a vortex airflow circulation, by the combined action of said fluid jet spoiler and said deflected fore-flap segment, along the forward facing surface of said downward deflected aft-flap segment; triggering separating of the streamwise airflow in front of said aft-flap segment by said vortex flow; producing a spanwise flow of said vortex airflow circulation toward the wing tip by the degree of sweep-back of said wing leading edge; positioning said aft-flap segment at an increasing angle-of-deflection, relative to said wing chordplane, at spanwise stations proceeding outboard toward the wing tip for confining a conically expanding spanwise vortex airflow circulation in a region substantially within the forwardly facing surface area of said downward deflected aft-flap segment; and thereby, controlling re-attachment of said separated streamwise airflow to the upper surface of said wing, downstream chordwise of said aft-flap segment.

42. Apparatus for controlling streamwise airflow over the upper surface of a wing having a swept-back leading edge, comprising: said wing having a chordplane and comprising a chordwise segmented swept-back leading edge portion for forming a movably connected swept-back spanwise leading edge segment; said leading edge segment being operatively positioned at a forward and downward angle-of-deflection relative to said wing chordplane; a spoiler member pivotally connected forward along said spanwise leading edge segment and being operatively positioned to project above the upper surface of said leading edge segment; a fluid jet spoiler comprising a series of nozzles mounted spanwise along said leading edge segment for blowing a pressurized fluid jet stream in a generally forward direction and at an upward angle-of-deflection relative to said leading edge segment; said fluid jet spoiler, said spoiler member and said leading edge segment, in combination, producing a spanwise flow vortex airflow circulation toward the wing tip, on the forward facing upper surface of said downward deflected leading edge segment, for inducing separation of the streamwise airflow in front of said leading edge segment; said leading edge segment being positioned at an increasing angle-of-deflection, relative to said wing chordplane, at spanwise stations proceeding outboard toward the wing tip for confining, in combination with said spoiler member and said fluid jet spoiler, a conically expanding spanwise vortex airflow circulation to the forward facing surface area of said downward deflected leading edge segment; and thereby controlling re-attachment of said separated streamwise airflow to the upper surface of said wing, downstream chordwise of said leading edge segment.

43. A method for controlling streamwise airflow over the upper surface of a wing having a chordplane and a swept-back leading edge, comprising: constructing the swept-back leading edge portion of said wing into forming a spanwise series of movably connected leading edge segments; operatively positioning said leading edge segments at a forward and downward angle-of-deflection relative to said wing chordplane; pivotally connecting a spanwise series of spoiler members forward on said downward deflected leading edge segments; positioning said spoilers at an upward angle-of-deflection relative to said leading edge segments for projecting above the upper surface of said leading edge segments and into the streamwise airflow for generating a vortex airflow circulation spanwise along the forward facing surfaces of said downward deflected leading edge segments; installing a fluid jet spoiler, comprising a spanwise series of nozzles, at the lower portion of the forward facing surfaces of said leading edge segments; blowing a fluid jet stream from said spanwise series of nozzles in a forward direction onto the upper surface of said downward deflected leading edge segments; producing a vortex airflow circulation, by the combined action of said deflected leading edge segments, said spoiler member and said fluid jet spoiler, along the forward facing surfaces of said downward deflected leading edge segments; triggering separation of the streamwise airflow in front of said leading edge segments by said vortex airflow circulation; producing a spanwise flow of said vortex airflow circulation toward the wing tip by the degree of sweep-back of said wing leading edge; positioning said leading edge segments at an increasing angle-of-deflection, relative to said wing chordplane, at spanwise stations proceeding outboard toward the wing tip for containing a conically expanding spanwise vortex airflow circulation substantially within the region of the forwardly facing surface area of said downward deflected leading edge segments; and thereby, controlling re-attachment of said separated streamwise airflow to the upper surface of said wing, downstream chordwise of said leading edge segments.

44. Apparatus for streamline airflow control over the upper surface of an airfoil span having a root section and a tip section, comprising: said airfoil span having a chordplane and a leading edge flap positioned at a forward and downward angle-of-deflection relative to said airfoil chordplane; means mounted spanwise along the forward portion of said downward deflected flap for generating a vortex airflow circulation spanwise along the forward facing surface of said flap to induce separation of the streamline airflow in front of said flap; said flap having an increase in chord length in a spanwise outboard direction from said root section toward said tip section and being positioned at an increasing angle-of-deflection, relative to said airfoil chordplane, in said spanwise outboard direction, for confining said vortex airflow circulation, in a continuous spanwise fashion, to the forward facing surface area of said downward deflected flap; and thereby controlling re-attachment of said separated streamline airflow to the upper surface of said airfoil, downstream chordwise of said flap.

45. A method for controlling streamwise airflow over the upper surface of an airfoil span having a chordplane, comprising: constructing the leading edge portion of said airfoil span into a movable leading edge segment; operatively positioning said leading edge segment at a forward and downward angle-of-deflection relative to said airfoil chordplane; mounting a vortex generating means forward on said downward deflected leading edge segment for creating a vortex airflow circulation along the forward facing surface of said downward deflected leading edge segment; triggering separation of the streamwise airflow in front of said leading edge segment by said vortex flow; increasing the chord length of said leading edge segment in a spanwise outboard direction from a root section of said airfoil toward a tip section and positioning said leading edge segment at an increasing angle-of-deflection, relative to said airfoil chordplane, at spanwise stations proceeding outboard toward said airfoil span tip section for containing a conically expanding spanwise vortex airflow circulation along the forwardly facing surface area of said downward deflected leading edge segment; and thereby, controlling re-attachment of said separated streamwise airflow to the upper surface of said airfoil, downstream chordwise of said leading edge segment.

46. Apparatus for controlling separation of streamline airflow across the upper surface of a wing having a swept-back leading edge, comprising: said wing having a chordplane and being constructed with a spanwise series of leading edge segments; said leading edge segments being operatively positioned at a forward and downward angle-of-deflection relative to said wing chordplane; means mounted to the forward edge of said leading edge segments for generating a vortex airflow circulation along the forward facing surface of said downward deflected leading edge segments and for inducing separation of the streamline airflow in front of said leading edge segments; said swept-back wing leading edge producing a spanwise flow of said vortex airflow circulation toward the wing tip; said leading edge segments having an increase in chord length in a spanwise outboard direction and being positioned at an increasing angle-of-deflection, relative to said wing chordplane, at spanwise stations proceeding outboard toward the wing tip for containing a conically expanding spanwise vortex on the forward facing surface of said downward deflected leading edge segments and thereby controlling re-attachment of said separated streamline airflow to the upper surface of said wing, downstream chordwise of said leading edge segments.

47. A method for controlling streamwise airflow over the upper surface of a wing having a chordplane and a swept-back leading edge, comprising: constructing the swept-back leading edge portion of said wing into a spanwise series of movable leading edge segments; operatively positioning said leading edge segments at a forward and downward angle-of-deflection relative to said wing chordplane; mounting a vortex generating means forward on said downward deflected leading edge segments for creating a vortex airflow circulation along the forward facing surface of said downward deflected leading edge segments; triggering separation of the streamwise airflow in front of said leading edge segments by said vortex flow; producing a spanwise flow of said vortex airflow circulation toward the wing tip by the degree of sweep-back of said wing leading edge; increasing the chord length of said leading edge segments in a spanwise outboard direction and positioning said leading edge segments at an increasing angle-of-deflection, relative to said wing chordplane, at spanwise stations proceeding outboard toward the wing tip for containing a conically expanding spanwise vortex within the forwardly facing surface area of said downward deflected leading edge segments; and thereby, controlling re-attachment of said separated streamwise airflow to the upper surface of said wing, downstream chordwise of said leading edge segments.

48. Apparatus for streamline airflow control over the upper surface of an airfoil span having a root section and a tip section, comprising: said airfoil span having a chordplane and a chordwise segmented leading edge portion comprising a fore-segment and and aft-segment; said aft-segment having a chordplane and being positioned at a forward and downward angle-of-deflection relative to said airfoil chordplane; said fore-segment being positioned at a forward and upward angle-of-deflection relative to the chordplane of said aft-segment for generating a vortex airflow circulation spanwise along the forward facing surface of said aft-segment, to induce separation of the streamline airflow in front of said aft-segment; said aft-segment having an increase in chord length in a spanwise outboard direction from said root section toward said tip section and being positioned at an increasing angle-of-deflection, relative to said airfoil chordplane, at spanwise stations proceeding outboard toward said tip section, for confining said vortex airflow circulation, in a continuous spanwise fashion, along the forward facing surface area of said downward deflected aft-segment; and thereby controlling re-attachment of said separated streamline airflow to the upper surface of said airfoil, downstream chordwise of said aft-segment.

49. Apparatus for streamline airflow control over the upper surface of an airfoil span having a root section and a tip section, comprising: a double segment flap having a fore-flap segment and an aft-flap segment, and being positioned at a forward and downward angle-of-deflection from the leading edge of said airfoil span; said fore-flap segment having its trailing edge hinged to the leading edge of said aft-flap segment and being positioned at a forward and upward angle-of-deflection relative to said aft-flap segment for producing a vortex airflow circulation in front of said aft-flap segment and for inducing separation of the streamline airflow in front of said aft-flap segment; said aft-flap segment having an increase in chord length in a spanwise outboard direction from said root section toward said tip section and being positioned at an increasing angle-of-deflection, relative to said airfoil, in said spanwise outboard direction for containing a conically expanding spanwise vortex on the forward facing surface of said downward deflected aft-flap segment and thereby controlling re-attachment of said separated streamline airflow to the upper surface of said wing, downstream chordwise of said double segment flap.

50. Apparatus for streamwise airflow control over the upper surface of a wing having a swept-back leading edge, comprising: said wing having a chordplane and being constructed with a spanwise series of leading edge segments; each of said spanwise segments comprising a fore-flap segment and an aft-flap segment; each of said aft-flap segments having a chordplane and being positioned at a forward and downward angle-of-deflection relative to said airfoil chordplane; and each of said fore-flap segments being positioned at a forward and upward angle-of-deflection relative to the chordplane of each of said aft-flap segments, for creating a vortex airflow circulation along the forward facing surface of said downward deflected aft-flap segments and for inducing separation of the streamwise airflow in front of said aft-flap segments; said swept-back wing leading edge producing a spanwise flow of said vortex airflow circulation towards the wing tip; said aft-flap segments having an increase in chord length in a spanwise outboard direction and being positioned at an increasing angle-of-deflection, relative to said wing chordplane, at spanwise stations proceeding outboard toward the wing tip for containing a conically expanding spanwise vortex on the forward facing surface of said downward deflected aft-flap segments and thereby controlling re-attachment of said separated streamline airflow to the upper surface of said wing, downstream chordwise of said aft-flap segments.

51. Apparatus for controlling separation of streamline airflow over a swept-back leading edge of a wing having a chordplane, comprising: a double segment flap, having a fore-flap segment and an aft-flap segment; said aft-flap segment being mounted from the leading edge of said wing at a forward and downward angle-of-deflection relative to said wing chordplane; said fore-flap segment having a trailing edge hingedly connected to a leading edge of said aft-flap segment and having a chordplane inclined upwardly relative to a chordplane of said aft-flap segment for creating a vortex flow ahead of said aft-flap segment to induce separation of streamline airflow in front of said aft-flap segment; said swept-back wing leading edge producing a spanwise flow of said vortex airflow circulation toward the wing tip; said aft-flap segment having an increase in chord length in a spanwise outboard direction and being positioned at an increasing angle-of-deflection, relative to said wing chordplane at spanwise stations proceeding outboard toward the wing tip for containing a conically expanding spanwise vortex on the forward facing surface of said downward deflected aft-flap segment and thereby controlling re-attachment of said separated streamline airflow to the upper surface of said wing, downstream chordwise of said double segment flap.

52. A method for controlling streamline airflow over the upper surface of a wing having a chordplane and a swept-back leading edge, comprising: constructing the swept-back leading edge portion of said wing for housing a spanwise series of movable, double chordwise segment flaps; operatively positioning said double chordwise segment flaps, comprising a fore-flap segment and an aft-flap segment, from the swept-back leading edge of said wing at a forward and downward angle-of-deflection relative to said wing chordplane; positioning said fore-flap segments at an upward angle-of-deflection relative to said aft-flap segments, for generating a vortex airflow circulation along the forward facing surface of said downward deflected aft-flap segments; triggering separation of the streamline airflow in front of said double chordwise segment flaps by said vortex flow; producing a spanwise flow of said vortex airflow circulation toward the wing tip by the degree of sweep-back of said wing leading edge; positioning said aft-flap segments at an increasing angle-of-deflection, relative to said wing chordplane, at spanwise stations proceeding outboard toward the wing tip and increasing the chord length of said aft-flap segments in a spanwise direction outboard for confining a conically expanding spanwise vortex airflow circulation along the forward facing surface area of said downward deflected aft-flap segments; and thereby, controlling re-attachment of said separated streamline airflow to the upper surface of said wing, downstream chordwise of said double chordwise segment flaps.

53. Apparatus for controlling separation of streamline airflow over the leading edge of an airfoil span having a root section and a tip section, comprising: said airfoil span having a chordplane and a flap mounted from the leading edge of said airfoil span; said flap being positioned at a forward and downward angle-of-deflection relative to said airfoil chordplane; and a spoiler pivotally connected forward on said flap and positioned to project above the upper surface of said flap for creating a vortex airflow circulation on the forward facing upper surface of said flap, to induce separation of the streamline airflow in front of said flap; said flap having an increase in chord length in a spanwise outboard direction from said root section toward said tip section and being positioned at an increasing angle-of-deflection, relative to said airfoil chordplane, at spanwise stations proceeding outboard toward said tip section, for confining said vortex airflow circulation to the forward facing surface area of said downward deflected flap; and thereby controlling re-attachment of said separated streamline airflow to the upper surface of said airfoil, downstream chordwise of said flap.

54. Apparatus for controlling separation of streamline airflow over a swept-back leading edge of a wing having a chordplane, comprising: a flap mounted from the leading edge of said wing and positioned at a forward and downward angle-of-deflection relative to said wing chordplane; a spoiler pivotally connected forward on said flap and positioned to project above the upper surface of said flap for creating a vortex airflow circulation on the forward facing upper surface of said flap, to induce separation of streamline airflow; said swept-back wing leading edge producing a spanwise flow of said vortex airflow circulation toward the wing tip; said flap having an increase in chord length in a spanwise outboard direction; said flap, being positioned at a predetermined increasing angle-of-deflection relative to said wing chordplane, at spanwise stations proceeding outboard toward the wing tip for containing a conically expanding spanwise vortex substantially within the region of the forward facing surface area of said downward deflected flap and thereby, controlling re-attachment of said separated streamline airflow to the upper surface of said wing, downstream chordwise of said flap.

55. Apparatus for controlling separation of streamline airflow over the leading edge of an airfoil span having a root section and a tip section, comprising: said airfoil span having a chordplane and being segmented chordwise for forming a movable leading edge segment positioned at a forward and downward angle-of-deflection relative to said airfoil chordplane; a spoiler retractably mounted forward on said leading edge segment and extendable to an upward angle-of-deflection relative to said leading edge segment, for projecting into the streamline airflow and generating a vortex airflow circulation spanwise along the forward facing surface of said leading edge segment to induce separation of the streamline airflow in front of said leading edge segment; said leading edge segment having an increase in chord length in a spanwise outboard direction from said root section toward said tip section and being positioned at an increasing angle-of-deflection, relative to said airfoil chordplane, at spanwise stations proceeding outboard toward said tip section, for confining, in combination with said spoiler, said vortex airflow circulation to the forward facing surface area of said downward deflected leading edge segment; and thereby controlling re-attachment of said separated streamline airflow to the upper surface of said airfoil, downstream chordwise of said leading edge segment.

56. Apparatus for controlling separation of streamline airflow over a swept-back leading edge of a wing having a chordplane, comprising: said wing being segmented chordwise and forming a spanwise series of leading edge segments; each leading edge segment being positioned at a forward and downward angle-of-deflection relative to said wing chordplane; a spoiler retractably mounted forward on each of said leading edge segments and being extendable to an upward angle-of-deflection relative to each of said leading edge segments, for projecting into the streamline airflow and creating a vortex airflow circulation, on the forward facing surface of each of said downward deflected leading edge segments to induce separation of the streamline airflow in front of said leading edge segments; said swept-back wing leading edge producing a spanwise flow of said vortex airflow circulation toward the wing tip; said leading edge segments having an increase in chord length in a spanwise outboard direction and being positioned at a predetermined increasing angle-of-deflection relative to said wing chordplane, at spanwise stations proceeding outboard toward the wing tip for containing a conically expanding spanwise vortex substantially within the region of the forward facing surface area of said downward deflected leading edge segments and thereby, controlling re-attachment of said separated streamline airflow to the upper surface of said wing, downstream chordwise of said leading edge segments.

57. A method for controlling streamline airflow over the upper surface of a wing having a chordplane and a swept-back leading edge, comprising: segmenting chordwise a leading edge portion of the wing for forming a spanwise series of movable leading edge segments; positioning said leading edge segments at a forward and downward angle-of-deflection relative to said wing chordplane; connecting a spanwise series of spoilers forward on said spanwise series of leading edge segments; positioning said spoilers at an upward angle-ofdeflection relative to said leading edge segments for projecting into the streamline airflow and generating a vortex airflow circulation spanwise along the forward facing surfaces of said downward deflected leading edge segments to induce separation of the streamline airflow in front of said leading edge segment; producing a spanwise flow of said vortex airflow circulation toward the wing tip by the degree of sweep-back of said wing leading edge; increasing the chord length of said leading edge segments in a spanwise outboard direction and positioning said leading edge segments at a predetermined increasing angle-of-deflection relative to said wing chordplane at spanwise stations proceeding outboard toward the wing tip for containing a conically expanding spanwise vortex substantially on the forward facing surface area of said downward deflected leading edge segments; and thereby controlling re-attachment of said separated streamwise airflow to the upper surface of said wing, downstream chordwise of said deflected leading edge segments.

58. Apparatus for controlling streamwise airflow over the upper surface of an airfoil span having a root section and a tip section, comprising: said airfoil span having a chordplane and being constructed with a leading edge spanwise segment; said leading edge spanwise segment having a chordplane and being operatively positioned at a forward and downward angle-of-deflection relative to said airfoil chordplane; a fluid jet spoiler comprising a spanwise series of nozzles mounted forward on said leading edge spanwise segment for blowing a pressurized fluid jet stream in a generally forward and upward direction relative to said leading edge spanwise segment chordplane, and producing a vortex airflow circulation on the forward facing surface of said downward deflected leading edge spanwise segment to induce separation of the streamwise airflow in front of said leading edge spanwise segment; said leading edge spanwise segment having an increase in chord length in a spanwise outboard direction from said root section toward said tip section and being positioned at an increasing angle-of-deflection, relative to said airfoil chordplane, at spanwise stations proceeding outboard toward said tip section, for confining, in combination with said fluid jet spoiler, said vortex airflow circulation in a region substantially within the forward facing surface area of said leading edge spanwise segment and thereby controlling re-attachment of said separated streamwise airflow to the upper surface of said airfoil, downstream chordwise of said leading edge spanwise segment.

59. Apparatus for controlling streamwise airflow over the upper surface of a wing having a swept-back leading edge, comprising: said wing having a chordplane and being constructed with a leading edge segment rotatable about a spanwise hingeline; said leading edge segment having a chordplane and being rotatively positioned to a forward and downward angle-of-deflection relative to said wing chordplane; a fluid jet spoiler comprising a spanwise series of nozzles mounted forward on said leading edge segment for blowing a fluid jet stream in a generally forward and upward direction relative to said leading edge segment chordplane, and producing a vortex airflow circulation on the forward facing surface of said downward deflected leading edge segment for inducing separation of the streamwise airflow in front of said leading edge segment; said swept-back wing leading edge producing a spanwise flow of said vortex airflow circulation towards the wing tip; said leading edge segment having an increase in chord length in a spanwise outboard direction and being positioned at a predetermined increasing angle-of-deflection, relative to said wing chordplane, at spanwise stations proceeding outboard toward the wing tip for containing, in combination with said fluid jet spoiler, a conically expanding spanwise vortex airflow circulation substantially trapped on the forward facing surface of said downward deflected leading edge segment and thereby controlling re-attachment of said separated streamwise airflow to the upper surface of said wing, downstream chordwise of said leading edge segment.

60. A method for controlling streamwise airflow over the upper surface of a wing having a chordplane and a swept-back leading edge, comprising: segmenting chordwise a leading edge portion of the wing for forming a spanwise series of movable leading edge segments having a chordplane; positioning said leading edge segments at a forward and downward angle-of-deflection relative to said wing chordplane; mounting a fluid jet spoiler, comprising a spanwise series of nozzles, forward on said leading edge segments; blowing a fluid jet stream from said nozzles in a generally forward and upward direction relative to said leading edge segment chordplane, and producing a vortex airflow circulation on the forward facing surface of said downward deflected leading edge segments for inducing separation of the streamwise airflow in front of said leading edge segments; producing a spanwise flow of said vortex airflow circulation toward the wing tip by the degree of sweep-back of said wing leading edge; increasing the chord length of said leading edge segments in a spanwise outboard direction and positioning said leading edge segments at a predetermined increasing angle-of-deflection relative to said wing chordplane at spanwise stations proceeding outboard toward the wing tip for containing, in combination with said fluid jet spoiler, a conically expanding spanwise vortex substantially trapped on the forward facing surface of said downward deflected leading edge segments; and thereby controlling re-attachment of said separated streamwise airflow to the upper surface of said wing, downstream chordwise of said leading edge segments.

61. Apparatus for streamline airflow control over the upper surface of an airfoil span having a root section and a tip section comprising: said airfoil span having a chordplane and comprising a chordwise segmented leading edge portion for forming a leading edge flap having movably interconnected fore-segment and aft-segment; said flap being operatively positioned at a forward and downward angle-of-deflection relative to said airfoil chordplane; said fore-segment being operatively positioned at a forward and upward angle-of-deflection relative to said aft-segment; a fluid jet spoiler comprising a spanwise series of nozzles being mounted forward on the upper surface of said aft-segment for blowing a fluid jet stream from said nozzles at a generally forward and upward angle-of-deflection relative to said aft-segment; said fluid jet spoiler in combination with said fore-segment, producing a vortex airflow circulation on the forward facing upper surface of said downward deflected aft-flap segment for inducing separation of the streamwise airflow in front of said flap; said aft-segment having an increase in chord length in a spanwise outboard direction from said root section toward said tip section and being positioned at an increasing angle-of-deflection, relative to said airfoil chordplane, at spanwise stations proceeding outboard toward said tip section, for confining, in combination with said fluid jet spoiler and said fore-segment, said vortex airflow circulation along the forward facing surface area of said downward deflected aft-segment; and thereby controlling re-attachment of said separated streamline airflow to the upper surface of said airfoil, downstream chordwise of said aft-segment.

62. Apparatus for streamline airflow control over the upper surface of a wing having a swept-back leading edge, comprising: said wing having a chordplane and comprising a chordwise segmented leading edge portion forming a movably interconnected fore and aft-segment, leading edge flap; said aft-flap segment having a chordplane and being operatively positioned at a forward and downward angle-of-deflection relative to said wing chordplane; said fore-flap segment being operatively positioned at a forward and upward angle-of-deflection relative to said aft-flap segment chordplane; a fluid jet spoiler comprising a spanwise series of nozzles mounted forward on the upper surface of said aft-flap segment for blowing a pressurized fluid jet stream in a generally forward direction and at an upward angle-of-deflection relative to said aft-flap segment chordplane; said fluid jet spoiler in combination with said fore-flap segment, producing a vortex airflow circulation, on the forward facing upper surface of said downward deflected aft-flap segment, for inducing separation of the streamline airflow in front of said aft-flap segment; said swept-back wing leading edge producing a spanwise flow of said vortex airflow circulation towards the wing tip; said aft-flap segment having an increase in chord length in a spanwise outboard direction and being positioned at a predetermined increasing angle-of-deflection, relative to said wing chordplane, at spanwise stations proceeding outboard toward the wing tip for containing, in combination with said fluid jet spoiler and said fore-flap segment, a conically expanding spanwise vortex airflow circulation substantially trapped on the forward facing surface of said downward deflected aft-flap segment and the thereby controlling re-attachment of said separated streamline airflow to the upper surface of said wing, downstream chordwise of said aft-flap segment.

63. A method for controlling streamwise airflow over the upper surface of a wing having a chordplane and a swept-back leading edge, comprising: segmenting chordwise the swept-back leading edge portion of said wing for forming a fore-flap segment and an aft-flap segment; operatively positioning said aft-flap segment at a forward and downward angle-of-deflection relative to said wing chordplane; positioning said fore-flap segment at a forward and upward angle-of-deflection relative to said aft-flap segment; installing a fluid jet spoiler, comprising a series of nozzles, spanwise along the lower portion of the forward facing surface of said aft-flap segment; blowing a fluid jet stream from said spanwise series of nozzles in a forward direction onto the upper surface of said fore-flap segment; producing a vortex airflow circulation, by the combined action of said fluid jet spoiler and said deflected fore-flap segment, along the forward facing surface of said downward deflected aft-flap segment; triggering separation of the streamwise airflow in front of said aft-flap segment by said vortex airflow circulation; producing a spanwise flow of said vortex airflow circulation towards the wing tip by the degree of sweep-back of said wing leading edge; increasing the chord length of said aft-flap segment in a spanwise direction outboard for forming a spanwise tapered aft-flap segment and positioning said aft-flap segment at an increasing angle-of-deflection, relative to said wing chordplane, at spanwise stations proceeding outboard toward the wing tip for confining, in combination with said fluid jet spoiler and said fore-flap segment, a conically expanding spanwise vortex airflow circulation in a region substantially within the forward facing surface area of said downward deflected aft-flap segment; and thereby, controlling re-attachment of said separated streamwise airflow to the upper surface of said wing, downstream chordwise of said aft-flap segment.

64. Apparatus for controlling streamwise airflow over the upper surface of a wing having a swept-back leading edge, comprising: said wing having a chordplane and comprising a chordwise segmented leading edge portion for forming a movably connected leading edge segment; said leading edge segment being operatively positioned at a forward and downward angle-of-deflection relative to said wing chordplane; a spoiler member pivotally connected forward on said leading edge segment and being operatively positioned to project above the upper surface of said leading edge segment; a fluid jet spoiler comprising a spanwise series of nozzles mounted forward on said leading edge segment for blowing a presurized fluid jet stream in a generally forward direction and at an upward angle-of-deflection relative to said leading edge segment; said fluid jet spoiler and said spoiler member, in combination, producing a vortex airflow circulation on the forward facing upper surface of said downward deflected leading edge segment, for inducing separation of the streamwise airflow in front of said leading edge segment; said swept-back wing leading edge producing a spanwise flow of said vortex airflow circulation toward the wing tip; said leading edge segment having an increase in chord length in a spanwise outboard direction for forming a spanwise tapered leading edge segment and being positioned at an increasing angle-of-deflection, relative to said wing chordplane, at spanwise stations proceeding outboard toward the wing tip for confining, in combination with said spoiler member and said fluid jet spoiler, a conically expanding spanwise vortex airflow circulation to the forward facing surface area of said downward deflected leading edge segment; and thereby controlling re-attachment of said separated streamwise airflow to the upper surface of said wing, downstream chordwise of said leading edge segment.

65. A method for controlling streamwise airflow over the upper surface of a wing having a chordplane and a swept-back leading edge, comprising: constructing the swept-back leading edge portion of said wing into forming a spanwise series of leading edge segments; operatively positioning said leading edge segments at a forward and downward angle-of-deflection relative to said wing chordplane; pivotally connecting a spoiler member forward on each of said downward deflected leading edge segments; positioning said spoiler members to project above the upper surface of said leading edge segments and into the streamwise airflow for generating a vortex airflow circulation spanwise along the forward facing surfaces of said downward deflected leading edge segments; installing a fluid jet spoiler, comprising a spanwise series of nozzles, at the lower portion of the forward facing surface of each of said leading edge segments; blowing a fluid jet stream from said spanwise series of nozzles in a forward direction for producing, in combination with said spoiler members and said deflected leading edge segments, a vortex airflow circulation along the forward facing surfaces of said downward deflected leading edge segments; triggering separation of the streamwise airflow in front of said leading edge segments by said vortex airflow circulation; producing a spanwise flow of said vortex airflow circulation toward the wing tip by the degree of sweep-back of said wing leading edge; increasing the chord length of said leading edge segments in a spanwise outboard direction for forming a series of spanwise tapered leading edge segments; positioning said leading edge segments at an increasing angle-of-deflection relative to said wing chordplane at spanwise stations proceeding outboard toward the wing tip; confining a conically expanding spanwise vortex airflow circulation in a region substantially within the forward facing surface area of said downward deflected leading edge segments by the combined action of said deflected leading edge segments, said spoiler members and said fluid jet spoilers; and thereby, controlling re-attachment of said separated streamwise airflow to the upper surface of said wing, downstream chordwise of said leading edge segments.

* * * * *